United States Patent
Anderson et al.

(10) Patent No.: US 6,316,538 B1
(45) Date of Patent: Nov. 13, 2001

(54) WATER DISPERSIBLE POLYMERIC COMPOSITIONS

(75) Inventors: Jeffrey L. Anderson; Edward Tokas, both of Racine, WI (US)

(73) Assignee: S. C. Johnson Commerical Markets, Inc., Sturtevant, WI (US)

( * ) Notice: Subject to any disclaimer, the term of this patent is extended or adjusted under 35 U.S.C. 154(b) by 0 days.

(21) Appl. No.: 09/690,869

(22) Filed: Oct. 17, 2000

Related U.S. Application Data

(62) Division of application No. 09/968,321, filed on Nov. 12, 1997, now Pat. No. 6,194,510.

(51) Int. Cl.$^7$ .............. C08F 283/00; C08K 3/00
(52) U.S. Cl. ............ 524/514; 524/507; 524/514; 525/126; 525/168; 525/181
(58) Field of Search .................. 524/502, 507, 524/513, 514

(56) References Cited

U.S. PATENT DOCUMENTS

| | | | |
|---|---|---|---|
| 3,562,355 | 2/1971 | Holden | 260/859 |
| 3,835,200 | 9/1974 | Lee, Jr. | 260/876 B |
| 3,978,160 | 8/1976 | Seiler et al. | 260/874 |
| 4,041,103 | 8/1977 | Davison et al. | 260/857 |
| 4,167,507 | 9/1979 | Haaf | 525/92 |
| 4,180,528 | 12/1979 | Fagerburg | 525/70 |
| 4,250,272 | 2/1981 | Ewins, Jr. et al. | 525/89 |
| 4,347,339 | 8/1982 | Boevink et al. | 525/180 |
| 4,444,923 | 4/1984 | McCarty | 523/406 |
| 4,481,331 | 11/1984 | Liu | 525/92 |
| 4,529,787 | 7/1985 | Schmidt et al. | 526/317 |
| 4,546,160 | 10/1985 | Brand et al. | 526/320 |
| 4,851,474 | 7/1989 | Willis | 525/92 |
| 5,008,334 | * 4/1991 | Harris et al. | 525/109 |
| 5,122,553 | * 6/1992 | Takayama et al. | 523/514 |
| 5,194,499 | * 3/1993 | Hergenrother | 525/91 |
| 5,314,954 | * 5/1994 | Ohishi et al. | 525/132 |
| 5,314,962 | * 5/1994 | Otsu et al. | 525/280 |
| 5,362,819 | * 11/1994 | McBain et al. | 525/404 |
| 5,384,184 | * 1/1995 | Saiki et al. | 428/230 |
| 5,496,876 | * 3/1996 | Jacquemin et al. | 524/155 |
| 5,521,267 | * 5/1996 | Giencke et al. | 526/201 |
| 5,565,499 | * 10/1996 | Klemarczyk | 522/13 |
| 5,631,329 | * 5/1997 | Yin et al. | 525/417 |

FOREIGN PATENT DOCUMENTS

| | | | |
|---|---|---|---|
| 0 048 391 A | 3/1982 | (EP) . | |
| 0 447 999 A | 4/1984 | (EP) . | |
| 0 184 467 A | 6/1986 | (EP) . | |
| 0 687 690 A1 | * 8/1995 | (EP) | 2/38 |

* cited by examiner

*Primary Examiner*—Christopher Henderson
(74) *Attorney, Agent, or Firm*—Renee J. Rymarz; Neil E. Hamilton; Warren R. Bovee

(57) ABSTRACT

An aqueous polymeric dispersion is described containing at least one substantially non-gelled polymeric composition comprising the reaction product of an A polymer which is an addition polymer having 3.5 or more reactive functional groups per polymer chain and a B polymer having about 2 to about 3 functional groups per polymer chain that are co-reactive with the reactive functional groups of the A polymer and an aqueous solvent. The aqueous polymeric dispersion is particularly useful in or as overprint varnishes, inks, pigment dispersions, paints, adhesives, coatings, support resins, emulsion polymers and the like.

15 Claims, No Drawings

WATER DISPERSIBLE POLYMERIC COMPOSITIONS

This application is a divisional application of application Ser. No. 08/968,321, filed Nov. 12, 1997 now issued as U.S. Pat. No. 6,194,510 dated Feb. 27, 2001.

BACKGROUND OF THE INVENTION

1. Field of the Invention

This invention relates to an aqueous dispersion of at least one polymeric composition. The polymeric compositions used herein provide a relatively low solution viscosity when used in aqueous dispersions. The invention also relates to the preparation of such aqueous dispersions. The aqueous dispersions of this invention are particularly useful for use as or in overprint varnishes, inks, pigment dispersions, adhesives, coatings, and the like. The invention also relates to the use of the aqueous dispersions as support resins and to the emulsion polymers prepared therewith.

2. Related Background Art

Water based polymeric compositions are well known. For example, U.S. Pat. No. 5,521,267 describes water soluble and water insoluble polymer resins that are free of low molecular weight emulsifiers and which may be used as binders in water-borne paints.

Block copolymers having an $A(BA)_n$ structure are a well known polymeric composition. For example, U.S. Pat. No. 5,362,819 describes an ABA curable block copolymer with an A block that is an unsaturated polyester, preferably having a mono-, or less desirably a di-, hydroxyl, carboxylic or amine end group, and a B block that is a flexible polymer having a glass transition temperature (Tg) of 0° C. or less. The flexible polymers are said to include those prepared from conjugated diene monomers, as well as polyethers or saturated polyester, which are linked to the A block by an ester, amide, urea or urethane group.

U.S. Pat. No. 4,347,339 describes a water soluble cationic block copolymer having a first polymer block having amino functional groups, a majority of which are quaternary amino groups, and a second polymer block having amino functional groups, a majority of which are not quaternary amino groups. The polymer blocks may be linked with bridges of other polymers, but are preferably linked by including a functional group such as a chloride or epoxide in the first polymer block that reacts with the amino functional groups of the second polymer block.

U.S. Pat. No. 4,851,474 describes a block copolymer comprising at least one polyester block and an elastomeric polymer block such as a polymer of one or more conjugated dienes. The elastomeric block is functionalized to incorporate only terminal functional groups, i.e., no more than 2 functional groups per polymeric block.

U.S. Pat. No. 5,008,334 describes resins containing an ABA block copolymer having an A block which is a reaction product of a diol and one or more diepoxides and a B block of an epoxy-capped, carboxyl-terminated polybutadiene or polybutadiene/acrylonitrile copolymer. Amine resins which are prepared from a resin that is a mixture of (i) the reaction product of a diol and at least one diepoxide and (ii) the ABA block copolymer are used in electrocoating formulations.

U.S. Pat. No. 5,314,954 describes aromatic polyester-polystyrene block copolymers produced by the polycondensation of styrene polymers having terminal functional groups, e.g. hydroxy, amino or carboxyl groups, with an excess of aromatic dicarboxylic acid dihalides and then subjecting the resulting condensation product to interfacial polymerization with aromatic dihydroxy compounds. These aromatic polyester-polystyrene block copolymers are said to have a minimum of uncopolymerized styrene and to be useful for the preparation of optical instruments.

Polyester block copolymers that provide an elastic yarn having a high elastic recovery and a high heat resistance are disclosed by U.S. Pat. No. 5,384,184. The polyester block copolymer comprises (A) 30 to 90% by weight of polyester segments comprising a benzenedicarboxylic acid as the main acid component and a diol having 5 to 12 carbon atoms between the hydroxyl groups as the main glycol component and (B) 70 to 10% by weight of polyester segments comprising an aromatic dicarboxylic acid as the main acid component and ethylene glycol, trimethylene glycol, tetramethylene glycol or 1,4-cyclohexane dimethanol as the main glycol component.

U.S. Pat. No. 5,496,876 describes a polyetheramide block copolymer constituted by the copolycondensation of polyamide polymers having reactive end groups with polyether sequences having reactive end groups. These polyetheramide block copolymers are blended with a styrene/diene copolymer to form thermoplastic polymeric compositions.

U.S. Pat. No. 4,180,528 describes an ABA type block copolymer having an A block that is an addition polymer and a B block that is a linear saturated polyester. The A block and B block are joined by addition polymerization.

European Patent Application Publication No. 0687690/A describes a high temperature polymerization process to produce terminally unsaturated oligomers having relatively low molecular weights. It is further disclosed that the terminally unsaturated oligomers having a carboxylic acid group can be reacted with polyfunctional alcohols having two or more alcohol functionalities to form polyesters. There is, however, no disclosure of terminally unsaturated oligomers having relatively high functionality.

Water dispersions of polymeric compositions that are highly functional, preferably having high acid functionality, as well as a high molecular weight, but which do not readily gel would be highly desirable.

SUMMARY OF THE INVENTION

This invention is related to an aqueous polymeric dispersion comprising (i) a polymeric composition that is the reaction product of an A polymer which is an addition polymer having 3.5 or more reactive functional groups per polymer chain and a B polymer having about 2 to about 3 functional groups per polymer chain that are co-reactive with the reactive functional groups of the A polymer and (ii) water. Optionally, the aqueous polymeric dispersion may also contain a solubilizing agent. Preferably, substantially all of the co-reactive functional groups of the B polymer are co-reacted. More, preferably, the reactive functional groups of the A polymer are condensation reactive functional groups.

Generally, the molar ratio of A polymer to B polymer is about 3:1 to about 2:1.7. Preferably when the B polymer is difunctional then the molar ratio of the A polymer to B polymer, based on the number average molecular weight (Mn) of the two polymers, is about 2:1 to about 2:1.7. When the B polymer is trifunctional then the preferable molar ratio of the A polymer to B polymer is about 3:1.

The condensation-reactive functional group is preferably selected from the group consisting of carboxyl, hydroxyl, epoxy, isocyanato, carboxyl anhydride, sulfo, esterified oxycarbonyl or amino. In a preferred embodiment, the A polymer has 3.5 or more carboxylic acid functional groups per polymer chain. Most preferably, this A polymer is a low molecular weight styrene/acrylic acid/a-methylstyrene polymer.

In another preferred embodiment, the A polymer has 3.5 or more hydroxyl functional groups per polymer chain. In this case, the A polymer is most preferably a low molecular weight styrene/2-ethylhexyl acrylate/2-hydroxyethyl methacrylate polymer.

Preferably, the B polymer is a condensation polymer selected from the group consisting of polyamide, polyester, epoxy, polyurethane, polyorganosiloxane and poly(ether). It is also preferable that the co-reactive functional groups of the B polymer are hydroxyl, epoxy, oxazolinyl or amino.

The aqueous polymeric dispersions of this invention include polymeric compositions that are highly functional polymers with a relatively high molecular weight that are unexpectedly free of gelling or gel particles. These polymeric compositions have a broad molecular weight distribution which enhance the utility and performance characteristics of the aqueous polymeric dispersions.

The dispersion medium may be only water or, if desirable, may include co-solvents, such as alcohols or glycol ethers.

The invention also relates to a method of preparing emulsion polymers using the aqueous dispersions described above to provide a polymeric support resin and to emulsion polymers prepared thereby. Such emulsion polymers are useful as overprint varnishes or for use in paint.

Yet another embodiment of this invention is directed to the use of the polymeric compositions used in the aqueous dispersions of this invention as emulsifiers for different polymers. This can be accomplished by mixing the polymeric composition, the different polymer and water.

DETAILED DESCRIPTION OF THE INVENTION

As previously noted, the aqueous polymeric dispersions of this invention contain at least one polymeric composition that is the reaction product of the A polymer and B polymer defied herein. The polymeric composition employed in the aqueous polymeric dispersion of this invention is described in copending U.S. patent application No. 08/967,848, filed Nov. 12, 1997, entitled "Polymeric Compositions, and Preparation and Use Thereof", the disclosure of which is incorporated by reference herein.

The A polymer of the polymeric composition used in this invention is an addition polymer having 3.5 or more reactive functional groups per polymer. The preparation of functionalized addition polymers is well known to those skilled in the art.

Preferably, the reactive functional groups of the A polymer are condensation reactive functional groups. Preferred condensation-reactive functional groups include carboxyl, hydroxyl, epoxy, isocyanato, carboxyl anhydride, sulfo, esterified oxycarbonyl or amino. Carboxyl and hydroxyl functional groups are most preferred. Carboxyl anhydride means a divalent functional group represented by —C(=O)OC(=O)— in which both free valences are bonded or linked to the addition polymer backbone or a single valent radical represented by R—C(=O)OC(=O)— wherein R is an alkyl group having 1–30 carbon atoms, an aryl group having 6 to 20 carbon atoms, an aralkyl group having 7 to 20 carbon atoms or an alkylaryl group having 7 to 20 carbon atoms. Sulfo is the radical represented by —SO$_2$OH and esterified oxycarbonyl is an group represented by —C(=O) O—R wherein R has the same meaning as described above, e.g., alkyloxycarbonyl, aryloxycarbonyl, aralkyloxycarbonyl, or alkaryloxycarbonyl.

The addition polymer, which is the product of a chain-growth polymerization reaction, is prepared from ethylenically unsaturated monomers. These compounds are well known and include, for example, $C_2$ to $C_{20}$ alkenes, $C_3$ to $C_{20}$ alkadienes, $C_5$ to $C_{20}$ alkatrienes, $C_5$ to $C_{20}$ cycloolefins, vinyl substituted aromatics, acrylic or methacrylic acid, $C_1$ to $C_{20}$ alkyl esters of acrylic acid or methacrylic acid, $C_6$ to $C_{20}$ aryl esters of acrylic or methacrylic acid, $C_7$ to $C_{20}$ aralkyl esters of acrylic or methacrylic acid and the like.

More particularly, such ethylenically unsaturated monomers include, without limitation, ethylene, propylene, 1-butene, 2-butene, isobutene, 1-pentene, 2-methyl-2-butene, 1-hexene, 4-methyl-1-pentene, 3,3-dimethyl-1-butene, 2,4,4-trimethyl-1-pentene, 6-ethyl-1-hexene, 1-heptene, 1-octene, 1-decene, 1-dodecene, allene, butadiene, isoprene, chloroprene, 1,5-hexadiene, 1,3,5-hexatriene, divinylacetylene, cyclopentadiene, dicyclopentadiene, norbornene, norbornadiene, methylnorbornene, cyclohexene, styrene, alpha-chlorostyrene, alpha-methylstyrene, allylbenzene, phenylacetylene, 1-phenyl-1,3-butadiene, 20 vinylnaphthalene, 4-methylstyrene, 4-methoxy-3-methylstyrene, 4-chlorostyrene, 3,4-dimethyl-alphamethylstyrene, 3-bromo-4-methyl-alpha-methylstyrene, 2,5-dichlorostyrene, 4-fluorostyrene, 3-iodostyrene, 4-cyanostyrene, 4-vinylbenzoic acid, 4-acetoxystyrene, 4-vinyl benzyl alcohol, 3-hydroxystyrene, 1,4-dihydroxystyrene, 3-nitrostyrene, 2-aminostyrene, 4-N, N-dimethylaminostyrene, 4-phenylstyrene, 4-chloro-1-vinylnaphthalene, acrylic acid, methacrylic acid, acrolein, methacrolein, acrylonitrile, methacrylonitrile, acrylamide, methacrylamide, methyl acrylate, methyl methacrylate, norbornenyl acrylate, norbornyl diacrylate, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, allyl alcohol, propoxylated allyl alcohol, ethoxylated allyl alcohol, glycidal acrylate, glycidal methacrylate, 2-phenoxyethyl acrylate, trimethoxysilyloxypropyl acrylate, dicyclopentenyl acrylate, cyclohexyl acrylate, 2-tolyloxyethyl acrylate, N,N-dimethylacrylamide, isopropyl methacrylate, ethyl acrylate, methyl alpha-chloroacrylate, beta-dimethylaminoethyl methacrylate, N-methyl methacrylamide, ethyl methacrylate, 2-ethylhexyl acrylate, neopentyl glycol diacrylate, cyclohexyl methacrylate, hexyl methacrylate, 2-methylcyclohexyl methacrylate, beta-bromoethyl methacrylate, benzyl methacrylate, phenyl methacrylate, neopentyl methacrylate, butyl methacrylate, chloroacrylic acid, methyl chloroacrylic acid, hexyl acrylate, dodecyl acrylate, 3-methyl-1-butyl acrylate, 2-ethoxyethyl acrylate, phenyl acrylate, butoxyethoxyethyl acrylate, 2-methoxyethyl acrylate, isodecyl acrylate, pentaerythritol triacrylate, methoxy poly(ethyleneoxy) $_{12}$ acrylate, tridecoxy poly(ethyleneoxy)$_{12}$ acrylate, chloroacrylonitrile, dichloroisopropyl acrylate, ethacrylonirrile, N-phenyl acrylamide, N,N-diethylacrylamide, N-cyclohexyl acrylamide, vinyl chloride, vinylidene chloride, vinylidene cyanide, vinyl fluoride, vinylidene fluoride, trichloroethane, vinyl acetate, vinyl propionate, vinyl butyrate, vinyl benzoate, vinyl butyral, vinyl chloroacetate, isopropenyl acetate, vinyl formate, vinyl methoxyacetate, vinyl caproate, vinyl oleate, vinyl adipate, methyl vinyl ketone, methyl isopropenyl ketone, methyl alpha-chlorovinyl ketone, ethyl vinyl ketone, hydroxymethyl vinyl ketone, chloromethyl vinyl ketone, allylidene diacetate, methyl vinyl ether, isopropyl vinyl ether, butyl vinyl ethers, 2-ethylhexyl vinyl ether, 2-methoxyethyl vinyl ether, 2-chloroethyl vinyl ether, methoxyethoxy ethyl vinyl ether, hydroxyethyl vinyl ether, aminoethyl vinyl ether, alpha-methylvinyl methyl ether, divinyl ether, divinylether of ethylene glycol or diethylene glycol or triethanolamine cyclohexyl vinyl ether, benzyl vinyl ether, phenethyl vinyl ether, cresyl vinyl ether, hydroxyphenyl vinyl ether, chlorophenyl vinyl ether, naphthyl vinyl ether, dimethyl maleate, diethyl maleate, di(2-ethylhexyl) maleate, maleic anhydride, dimethyl fumarate, dipropyl fumarate, diamyl fumarate, vinyl ethyl sulfide, divinyl sulfide, vinyl p-tolyl sulfide, divinyl sulfone, vinyl ethyl sulfone, vinyl ethyl sulfoxide, vinyl sulfonic acid, sodium vinyl sulfonate, vinyl sulfonamide, vinyl benzamide, vinyl pyridine, N-vinyl pyrollidone, N-vinyl carbazole, N-(vinyl benzyl)-pyrrolidine, N-(vinyl benzyl) piperidine, 1-vinyl pyrene, 2 isopropenyl furan, 2-vinyl dibenzofuran, 2-methyl-5-vinyl pyridine, 3-isopropenyl pyridine, 2-vinyl piperidine, 2-vinyl quinoline, 2-vinyl benzoxazole, 4-methyl-5-vinyl thiazole, vinyl thiophene, 2-isopropenyl thiophene, indene, coumarone, 1-chloroethyl vinyl sulfide, vinyl 2-ethoxyethyl sulfide, vinyl phenyl sulfide, vinyl 2-naphthyl sulfide, allyl mercaptan, divinyl sulfoxide, vinyl phenyl sulfoxide, vinyl chlorophenyl sulfoxide, methyl vinyl sulfonate, vinyl sulfoanilide, unblocked and blocked acetoacetoxy functional monomers (e.g., acetoacetoxyethyl methacrylate and acetoacetoxyethyl acrylate), unblocked and blocked meta-tetramethylisocyante, unblocked and blocked isocyanto ethyl methacrylate and the like.

At least one of the ethylenically unsaturated monomeric units of the addition polymer must have a reactive functional group such as a condensation reactive functional group, preferably a carboxyl group, hydroxyl group, or epoxy group, most preferably a carboxyl group or hydroxyl group. Exemplary acid-functional ethylenically unsaturated monomers include but are not limited to aconitic acid, acrylic acid, beta-carboxymethyl acrylate, cinnamic acid, crotonic acid, fumaric acid, itaconic acid, maleic acid, methacrylic acid, and mixtures thereof. Also suitable are certain monomers that are said to contain so-called "latent" acid moieties, such as cyclic anhydrides. Accordingly, a suitable cyclic anhydrides include but are not limited to itaconic anhydrides, maleic anhydride, and mixtures thereof. Monomers of acrylic or methacrylic acid are most preferred. The condensation reactive functional group is preferably a part of the ethylenically unsaturated monomer, although it may, if desired, be added to the addition polymer after formation of the polymer.

Preferably, the addition polymer used as the A polymer in the present invention is an acrylic copolymer or a styrene/acrylic acid or styrene/(meth)acrylic acid copolymer, more preferably a styrene/α-methylstyrene/acrylic acid copolymer. Generally, the preferred styrene/acrylic acid addition polymer is comprised of from 10 to 90% w/w styrene, and 10 to 90% w/w acrylic acid. The styrene may be replaced or admixed with α-methyl styrene if desired. As used herein "% w/w" is percent by weight of the total polymer weight unless stated to the contrary. Another preferred addition polymer used as the A polymer is a hydroxy acrylate or methacrylate copolymer or a styrene/hydroxy acrylate or styrene/hydroxy methacrylate copolymer, more preferably a styrene/hydroxy acrylate (or methacrylate)/acrylate (or methacrylate) copolymer.

Yet another addition polymer that may be employed as the A polymer in the polymeric composition used in this invention are hyperbranched polymers such as disclosed in copending U.S. patent application 09/389,821, filed Sep. 3, 1999, entitled "Process for Producing Hyperbranched Polymers", the disclosure of which is incorporated by reference herein. Such hyperbranched polymers having terminal ethylenic uasaturation would preferably have 3.5 or more condensation reactive functional groups per hyperbranched polymer.

Typically the addition polymer is a low molecular weight polymer between about 500 to about 50,000 Mn, preferably about 900 to about 3,000 Mn. As noted previously, the condensation-reactive functionality of the addition polymer must be at least 3.5 or greater, and is preferably between about 3.5 and about 20, most preferably between about 3.5 and about 10.

The preparation of addition polymers is well known to those skilled in the art, and includes gas phase polymerization, solution polymerization, batch polymerization, continuous reactor or tube polymerization, suspension polymerization and emulsion polymerization. Methods of preparing such addition polymers are described in U.S. Pat. No. 4,413,370, U.S. Pat. No. 4,529,787 and U.S. Pat. No. 4,546,160, the disclosure of each of which is incorporated by reference herein.

The B polymer of the polymeric compositions used in this invention has about 2 to about 3 functional groups that are co-reactive with the reactive functional groups of the A polymer. The preferred functional groups of the B polymer include: hydroxyl, carboxyl, epoxy, oxazolinyl and amino groups, although any group that is co-reactive with the reactive functional group of the A polymer is contemplated within the scope of this invention. The B polymer may be an addition polymer or condensation polymer, but preferably is a condensation polymer. The condensation polymer may be a polyamide, polyester, poly(ether), polyurethane or the like. The preparation of condensation polymers, like that of addition polymers, is well known to those skilled in the art. For example, polyesters may be prepared using common techniques of fusion processes with a glycol excess along with a tin catalyst. Polyamides may be readily prepared using a fusion process, without catalysis.

The preparation of polyesters or polyamides generally requires the use of polycarboxylic acids. Exemplary polycarboxylic acids include, without limitation, adipic, azelaic, benzophenone tetracarboxylic dianhydride, 1,4-cyclohexane dicarboxylate, chlorendic anhydride, dimer acids, fumaric acid, glutaric acid, hexahydrophthalic anhydride, itaconic acid, isophthalic acid, maleic acid or anhydride, phthalic anhydride, sebacic acid, suberic acid, succinic acid, terephthalic acid, tetrahydrophthalic anhydride, trimellitic anhydride, alkanyl succinic anhydride, 5-sodiosulfoisophthalic acid, or 5-lithiosulfoisophthalic acid. Generally, the preparation of polyester glycols will employ components such as 1,3-butanediol, 1,4-butanediol, cyclohexanedimethanol, diethylene glycol, dipropylene glycol, 2,2-dimethyl-1,3-pentane diol, 2-butyl-2-ethyl-1,3-propane diol, ethylene glycol, propylene glycol, pentaerythritol, trimethylol ethane, trimethylol propane, tris (hydroxy ethyl)isocyanurate, 1,6-hexanediol, 1,5-pentanediol, triethylene glycol, tetraethylene glycol, hydrogenated Bisphenol A, glycerin, 2 methyl-1,3-propane diol or the like.

In the preparation of polyamides, the polyamine functional components typically may be chosen from ethylene diamine, hexamethylene diamine, 2-methyl-1, 5 pentane diamine, isophorone diamine, methylene dicyclohexyl amine, trimethyl hexamethylene diamine or the like.

The starting acids are polymerized fatty acids, which are mixtures of monobasic acids (C18), dibasic fatty acids (C36) and trimer or polybasic fatty acids (C54 or higher), dicarboxylic acids including aliphatic, cycloaliphatic, and aromatic dicarboxylic acids such as oxalic, glutaric, malonic, adipic, succinic, sebacic, azelaic, suberic, pimelic, terephthalic, 1,4 or 1,3-cyclohexane, naphthalene, phthalic, isophthalic, dodecanedioic dicarboxylic acids. Preferred dicarboxylic acids are straight chain aliphatic diacids having at least 6 carbon atoms and more preferably 6 to about 22 carbon atoms such as sebacic, dodecanedioic, and azelaic dicarboxylic acids. Mono carboxylic acids may be added to control the molecular weight. Preferred monocarboxylic acids are linear and have 2 to 22 carbon atoms. Most preferred are stearic and oleic acids.

The diamines used in the preparation of the polyamide may be one or more of the known aliphatic, cycloaliphatic or aromatic diamines having from about 2 to about 20 carbon atoms. Preferred are the alkylene diamines such as ethylene diamine, 1,3-diaminopropane, 1,4-diaminobutane, p-xylene diamine, 1,6-hexamethylene diamine, cyclohexyl amine, bis(4-cyclohexylamine)methane, 2,2'-bis(4-cyclohexylamine)propane, polyglycol diamines, isophorone diamine, m-xylene diamine, cyclohexylbis(methylamines), polyoxyalkylenediamine (sold by Huntsman under the trade name Jeffamine), 2-methyl-1,5-pentane diamine, 1,4-bis-(2-aminoethyl)benzene, dimer diamine, polyether diamines, methylpentamethylene diamine, and piperazine. The preferred diamines are straight chained aliphatic diamines of 2 to about 20 carbon atoms, especially ethylene diamine and hexamethylene diamine, and cycloaliphatic diamines, especially 4-4'-methylenebis(cyclohexylamine) and piperazine. Mono amines may be added to control the molecular weight. Preferred mono amines are linear and have 2 to 22 carbon atoms. Most preferred are stearyl and oleyl amines.

The condensation polymers may also include mono functional compounds to control functionality. For example, a mono acid such as benzoic acid, p-tertbutyl benzoic acid, veratic acid, rosin, lauric acid, fatty acids such as those made from soya, linseed, tall and dehydrated castor oils may be employed in the preparation of polyesters while mono amines such as stearyl amine, tallow amine and cyclohexyl amine may be employed in the preparation of polyamides.

Preferred polyamide compositions employ nylon type monomers such as adipic acid and 2-methyl-1,5-pentane diamine or dimer acid based monomers using dimer acid with isophorone diamine. Preferred polyester monomers include isophthalic acids and cyclohexyl dicarboxylates along with common glycols such as 3-methyl-1,3-propanediol, 2,2-dimethyl-1,3-propanediol, and cyclohexane dimethylol.

The polymeric compositions used in this invention may be prepared by the polymerization of the previously described A and B polymers at a reaction temperate and for a time sufficient to form the polymeric composition. Preferably the reaction is a step growth polymerization reaction, i.e., a condensation polymerization reaction. The polymeric composition may be prepared by reacting an A polymer which is an addition polymer having 3.5 or more reactive functional groups (preferably condensation reactive functional groups) per polymer chain with a B polymer having about 2 to about 3 functional groups per polymer chain that are co-reactive with the reactive functional groups of the A polymer. Preferably the reaction is conducted at a temperature and for a time sufficient to form the polymeric compositions by reacting substantially all the co-reactive functionality on the B polymer. Preferably, when the B polymer is difunctional, then the molar ratio of A polymer blended with the B polymer is about 2:1 to about 2:1.7. When the B polymer is trifunctional, then the molar ratio of A polymer blended with B polymer is preferably about 3:1. The preferred blending ratio when a mixture of difunctional and trifunctional B polymer is employed can be readily ascertained by those skilled in the art.

The temperature and time of the reaction will depend on the A and B polymers. For example, if condensation of A and B is by esterification then the reaction temperature may reach 240° C. or higher, while if condensation is through the formation of urethane linkages, then room temperature may be all that is necessary. The reaction temperature of the process for preparing the polymeric compositions is generally between about −50° C. to about 300° C., preferably from about 150° C. to about 240° C. The reaction temperature should not exceed the decomposition temperature of either the A polymer or the B polymer. Typically the reaction temperature is maintained from 0.5 to about 6 hours.

If desired, solvents and catalysts may be employed in the preparation of the polymeric composition used in this invention. The use of such solvents and catalysts is well known to those of ordinary skill in the art. It is important that the A and B polymers be compatible with each other to provide adequate mixing. If the polymers are not compatible, then solvent or staged addition of the polymers may be employed to overcome this. Solvents that are well known to those skilled in the art are also useful in controlling viscosity and permitting appropriate mixing when high temperatures can not be used. In addition, small amounts of solvent may be used for products of reaction such as xylene to azeotrope off water.

The molecular weight of the polymeric compositions used in this invention are generally broad. Both high weight average molecular weight (Mw) and z-average molecular weight (Mz) are possible, while the number average molecular weight (Mn) is typically not as high. The polymeric compositions used in this invention are preferably high molecular weight polymeric compositions prepared from low molecular weight polymers in the substantial absence of gel. Without being bound to the theory, it is believed that the functionality of the reacting polymers is responsible for the absence of gel.

The resulting polymeric compositions used in this invention may take the form of block copolymer, e.g. ABA block copolymers. However, the polymeric compositions used in this invention are not restricted to block copolymers, but may result, for example in highly branched or complex polymers that may not be considered block copolymers.

Generally, the weight average molecular weight of the polymeric compositions used in this invention range from about 4,000 to about 250,000, more preferably between about 5,000 to about 50,000 as measured by gel permeation chromatography using polystyrene standards. In addition, the preferred polymeric compositions having acid functionality typically have an acid number between about 40 to about 200. As will be apparent to one of ordinary skill in the art, the glass transition temperature (Tg) of the polymeric compositions of this invention can be readily varied by altering the monomeric make up of the A and B polymers. Typically the average Tg is −50° C. to 120° C., although the end use generally dictates the type of Tg that will be sought.

Industrial Applicability

This invention is related to the preparation of industrially useful aqueous polymeric dispersions of the polymeric compositions described herein. Such aqueous dispersions are particularly useful for use as dispersants, film printing inks, metal coatings, wood coatings, overprint varnishes, paper inks, primers, film primers, architectural compositions, adhesives, support resins, polymeric emulsifiers or the like.

Generally, the aqueous dispersions are made by adding the polymeric compositions described herein into an aqueous solvent system. Such solvent systems can include dispersants and cosolvents. The aqueous polymeric dispersions of this invention may also contain a solubilization agent, such as neutralization agents, like acids and bases. If desired, the polymeric compositions described herein can be pretreated with an acidic or basic composition in a pretreatment step before their mixing with the aqueous solvent system. Alternatively, such treatment with an acidic or basic composition can be performed after the polymeric composition has been mixed with the aqueous solvent system. Generally, the aqueous polymeric dispersion will contain the polymeric composition in an amount of about 1% to about 75%; by weight of the total dispersion, preferably about 5% to about 60%. If a solubilization agent is employed, then it is typically resent in an amount to effectively solubilize the polymeric composition in the aqueous solvent. If the solubilizing agent is a neutralizing agent, such as an acid or base, then it is generally present in an amount effective to substantially neutralize the polymeric composition, i.e., a degree of neutralization (DN) of about 60% to about 100% of the available carboxylic acid groups.

At a minimum, the aqueous polymeric dispersions of this invention contain at least one polymeric composition as described herein and water. Other components of the solution will depend on the application thereof. For example, many aqueous polymeric dispersions will contain a neutralizing agent, e.g. ammonium hydroxide or triethylamine, to enhance the solubility of the polymeric compositions. Other possible components, include colorants or pigments, polymers, co-solvents, coalescing agents, defoamers, wetting agents, waxes, thickeners and the like. The selection of such additional components will depend on the application (e.g. overprint varnish, inks, pigment dispersions, adhesives, paints, polymer dispersions or coatings) and can be readily ascertained by those skilled art.

This invention is also directed to a method of preparing novel emulsion polymers by using the polymeric composition described herein as a support resin. In this method, the polymeric composition may act as the primary emulsifying surfactant. If desired additional surfactants may be used.

The emulsion polymer is prepared by first adding the polymeric composition of choice to water to from an aqueous dispersion. The aqueous dispersion is then heated, e.g., 75°–90° C., typically followed by the addition of initiator and then introductions of a monomer feed containing at least one ethylenically tmsaturated monomer. Exemplary ethylenically unsaturated mononmers have been described previously.

This invention will be better understood from the Experimental Details which follow. However, one skilled in the art will readily appreciate that the specific methods and results discussed are merely illustrative of the invention and no limitation of the invention is implied.

EXPERIMENTAL DETAILS

"A" POLYMERS

Preparation of Styrene/α-Methylstyrene/Acrylic Acid Resins Having Carboxylic Acid Functionality

"A" POLYMER (1)

A low molecular weight styrene/α-Methylstyrene/acrylic acid resin was prepared by polymerizing 22% styrene, 45% α-methyl styrene and 33% acrylic acid in 20% xylene with 3 mole percent initiator at 490° F. (254°) in a continuous stirred tank reactor (CSTR) with a 12 min. residence time, followed by stripping out the solvent and any unreacted monomers.

The resulting styrene/α-methylstyrene/acrylic acid resin had a number average molecular weight (Mn), a weight average molecular weight (Mw),and a z average molecular weight (Mz) of 1170, 1770 and 2590, respectively. The number average carboxylic acid functionality (Fn), the weight average carboxylic acid functionality (Fw), the acid number (solid), the glass transition temperature (Tg) (onset and midpoint) of the polymer are set forth in Table 1.

"A" POLYMERS (2–4)

Styrene/α-methylstyrene/acrylic acid resins were prepared in a manner similar to A Polymer 1. The components and characteristics of those resins, as well as those of A Polymer 1 are set forth in Table 1.

Preparation of a Hydroxy Functional Acrylic

"A" POLYMER (5)

Methylmethacrylate (27a), butyl acrylate (15%) and 2-hydroxy ethyl acrylate (58%) were dissolved in 20% butyl acetate and were polymerized at 450° F. for 15 minutes under in the manner substantially similar to that described in U.S. Pat. No. 4,546,160. The reaction product was then reduced to 51% solids in ethyl diglyme. The resulting hydroxy functional acrylic had a number average molecular weight of 1180 and a hydroxy functionality per chain of 5.28

TABLE 1

| A Polymer | % STY/AMA/AA | Mn | Mw | Mz | Fn | Fw | Acid Number | Tg (onset/midpoint) |
|---|---|---|---|---|---|---|---|---|
| 1 | 22/45/33 | 1000 | 1607 | 2360 | 5.08 | 7.71 | 267 | 75/81 |
| 2 | 22/45/33 | 1180 | 1810 | 2700 | 5.72 | 8.78 | 266 | 79/85 |
| 3 | 13/55/32 | 988 | 1459 | 2124 | 4.74 |  | 265 | 77/85 |
| 4 | 22/45/33 | 1003 | 1512 | 2231 | 4.72 | 7.12 | 264 | 73/83 |

STY—styrene
AMS—α-methylstyrene
AA—acrylic acid

"B" POLYMERS

Preparation of Polyester Polymers

"B" POLYMER (1)

A polyester was prepared by charging 2-methyl-1,3-propane diol (43.06 parts; 21.53 lbs; 9.77 kgs), isophthalic acid (47.65 parts; 23.83 lbs; 10.81 kgs) and Fascat 4100 (a tin catalyst available from Elf atochem chemical) (0.08 parts; 0.04 lbs; 0.20 kgs) to a reactor with a nitrogen atmosphere. The charge was heated to 210° C. while maintaining the top of the column at 100° C. or less. The reaction was held until the acid number was less than 5, then cooled to 150° C. and held overnight. The following day the reaction contents were reheated to 150° C. followed by the addition of 1,4-cyclohexane dicarboxylate (24.69 parts; 12.35 lbs; 5.60 kgs) and Fascat 4100 (0.02 parts; 0.01 lbs; 0.005 kgs) to the reactor contents. The reactor contents were then heated to 220° C. while maintaining a nitrogen blanket. The top of the column was held at 100° C. or less and the reaction was held to an acid value of 5 or less was reached. The resulting polyester resin had a number average molecular weight of (Mn) 3023, weight average molecular weight (Mw) of 6486 and a z average molecular weight (Mz) of 10,720. The Tg was determined to be 8° C. at onset and 14° C. at midpoint.

"B" POLYMERS (2–6)

Polyester resins were prepared in a manner similar to B Polymer 1 with the exception that the components of the polyester and/or the mole ratio of the components differed. The components, mole ratio, Mn, Mw, Mz and Tg (onset/midpoint) of the B polyesters (1–6) are set forth in Table 2 below.

"B" POLYMER (8)

Sylvodym® T-18 dimer acid (76.598 parts), cyclohexyl amine (1.500 parts) and Dow Corning 200 (0.002 parts) were charged to a reactor and heated to 130° C. Next, isophorone diamine (26.700 parts) was added to the reactor while holding the temperature between 130 to 135° C. The reaction mixture was then slowly heated to 220° C. using a nitrogen sparge to remove the water. The reaction temperature was held until substantially all of the water was removed and the polyamide was recovered. Mn =3184 (theoretical); Base value =29.; Tg =29/38° C.

Preparation of a Polyurethane B Polymer

"B" POLYMER (9)

Ethyl diglyme (EDG) (600.3g) and 2-methyl-1,3-propanediol (MPD) (146.4g) were added to a 2 Liter 4-necked reaction flask. The flask was equipped with an agitator, $N_2$ inlet, thermocouple and condenser with a trap to collect water. The mixture was heated to 150° C. under nitrogen to remove any excess water or solvent impurities. After approximately 1 hour the reaction was allowed to cool to 30° C. and the nitrogen was removed. Tetramethylxylenediisocyanate (TMXDI)(454.2g) was then added to the reaction mixture through an addition funnel at a rate of approximately 1 drop per second for a 3 hour period during

TABLE 2

| B Polymer | Composition | Mole Ratio | Mn | Mw | Mz | Tg ° C. (onset/midpoint) |
| --- | --- | --- | --- | --- | --- | --- |
| 1 | MpDiol/Isophthalic Acid/CHDA | 10/6/3 | 3023 | 6486 | 10720 | 8/14 |
| 2 | Esterdiol 204/Isophthalic Acid | 4/3 | 1294 | 1975 | 2893 | 1/6 |
| 3 | CHDM/Azeleic Acid | 7/6 | 2695 | 5756 | 9556 | −48/−42 |
| 4 | Neopentyl Glycol/Maleic Anhydride/Adipic Acid | 13/3/9 | 2432 | 4851 | 8347 | −40/−37 |
| 5 | Esterdiol 204/CHDM/Isophthalic Acid | 5/3/7 | 2332 | 4452 | 7055 | 25/31 |
| 6 | Same As above (5% excess glycol) | 5/3/7 | 2427 | 4442 | 6958 | 24/29 |

CHDA—1,4-cyclohexane dicarboxylic acid
CHDM—1,4-cyclohexane dimethanol
MpDiol—2-methyl-1,3-propane diol available from ARCO Chemical, Newton Square, PA.
Esterdiol 204—available from Union Carbide, Danbury, CT.

Preparation of Polyamide Resins

"B" POLYMER (7)

Sylvodym® T-18 dimer acid ($C_{36}$ dimer acid available from Arizona Chemical) (77.198 parts), Kemamine® P-990D (Stearyl amine available from Witco Chemical) (4.150 parts) and Dow Corning 200 (a silicone defoamer) (0.002 parts) were charged to a reactor and heated to 130° C. under a nitrogen atmosphere. Next, a mixture of isophorone diamine (16.140 parts) and Dytek® A (available from E.I. DuPont de Nemours) (2-methyl-1,5-pentane diamine) (7.340 parts) was added to the reaction mixture while holding the temperature between 130 and 135° C. While under a nitrogen purge, the reaction mixture was slowly heated to about 220° C. and the temperature held until substantially all the theoretical water was removed. An amine functional polyamide resin was obtained. Mn =3160 (theoretical); Base value–32; Tg =6/12° C.

which the reaction temperature was maintained at 80° C. A polyurethane oligomer was recovered. Mn =2582 (theoretical).

Preparation of Polymeric Compositions

EXAMPLE 1

A polyester resin, B polymer (1), (963.0 g) was added to a reaction flask and heated to 150° C. The A polymer (1), a styrene/α-methylstyrene/acrylic acid resin, (541.7 g) was gradually added over 15 minutes followed by the addition of xylene (45 g). The trap was filled with xylene to keep 3% xylene in the reaction flask while heating the reaction mixture to 230° C. to draw off water. The reaction was conducted for 6.5 hours. The resulting polymeric compositions had an Mw of 26,180, an Mn of 3,444, an Mz of 109,700 and a Tg of 25/36° C. (onset/midpoint).

EXAMPLES 2–11

Various polymeric compositions were prepared from an A polymer of a styrene/α-methylstyrene/acrylic acid resin and a B polymer of a polyester resin in a manner similar to Example 1. The components and various characteristics of those polymeric compositions are set forth in Table 3 below.

TABLE 3

| Example | A Polymer | B Polymer | Mole Ratio B/A | % B | Acid Number | Mn | Mw | Mz | Tg °C. onset/mp |
|---|---|---|---|---|---|---|---|---|---|
| 2 | 3 | 2 | 1/2 | 40 | 140 | 1655 | 4261 | 9619 | 40/51 |
| 3 | 1 | 3 | 1/2 | 48 | 116 | 2618 | 16770 | 62610 | 5/17 |
| 4 | 1 | 4 | 1/2 | 55 | 116 | 2824 | 95260 | 864200 | −2/8 |
| 5 | 1 | 5 | 1.2/2 | 58 | 102 | 2345 | 8378 | 20450 | 47/56 |
| 6 | 1 | 6 | 1.2/2 | 58 | 93 | 2723 | 11550 | 33320 | 48/56 |
| 7 | 1 | 1 | 1/2 | 59 | 102 | 2715 | 20440 | 91990 | 40/45 |
| 8 | 1 | 1 | 1.25/2 | 65 | 72 | 3719 | 36310 | 382800 | 22/27 |
| 9 | 2 | 1 | 1.25/2 | 62 | 83 | 3008 | 23000 | 102900 | 31/40 |
| 10 | 2 | 1 | 1.4/2 | 65 | 72 | 3845 | 44700 | 234800 | 21/31 |
| 11 | 2 | 1 | 1.62/2 | 69 | 62 | 4327 | 139300 | 4015000 | 19/28 |
| 12 | 1 | ‡ | 1/3 | 34 | 148 | 2318 | 207000 | 2327000 | 3/19 |

‡ Tone 132b triol—a polycaprolactone polyol available from Union Carbide, Danbury, CT.
mp—midpoint

EXAMPLE 13

A polymeric composition was prepared from the A polymer (5), a hydroxy functional acrylic, and the B polymer (9), a polyurethane oligomer. To a one liter 4-necked reaction flask equipped with a nitrogen inlet, condenser, agitator and thermocouple was added 263.7g of B polymer (9). Then 6 drops of dibutyl tin dilaurate (DBTDL) was charged to the flask. The solution was preheated to 70° C., after which the A polymer (5) was slowly added dropwise to the reaction. After all the A polymer (5) had been added, the temperature of the reaction was increased to 85° C. and allowed to react for about 4.5 hours. The resulting solution had a deep yellow color. Mn =2646; Mw =6411; Mz =17290; OH Value =58.

EXAMPLE 14

A polymeric composition was prepared from the A polymer (4), i.e., a styrene/acrylic resin and B Polymer (8), a polyamide resin. The A polymer resin (38.85 parts) was charged to a reactor and then heated to 180° C. with agitation under nitrogen. This was followed by the addition of the B polymer (8) (61.85 parts) at 180° C. The mixture was then heated to 220° C. and held until the water was removed. The temperature was then raised to 230° C. and the polymeric composition was collected. Mn =2799; Mw =26990; Mz =93660; Tg =421620C; AV =80.

EXAMPLE 15

A polymeric composition was prepared in a manner similar to Example 14, except that the styrene/acrylic resin, i.e., the A polymer was 39.03 parts and the B polymer was B polymer (7). Mn =2939; Mw 24,300; Mz =87,920; Tg =30/46° C.; AV =38.

EXAMPLE 16

A polymeric composition was prepared from A polymer (4) and a B polymer of polypropylene oxide (PPO 425 available from Dow Chemical, Midlord, Mich.) having a number average molecular weight (Mn) of 639 and a functionality of 2 hydroxy groups per mole. The A polymer and B polymer were reacted at a molar ratio of 2 to 1 in the absence of a solvent and catalyst at a temperature of about 210 to 238° C. to form the desired polymeric composition. The resulting polymeric composition had a Mn of 1688, a Mw of 5945, a Mz of 17,120, an acid number (solid) of 164 and a Tg of 45/550° C. (onset/midpoint).

EXAMPLE 17

A polymeric composition was prepared in a manner similar to Example 16, except the B polymer was a polypropylene oxide (PPO 1000 available from Dow Chemical) having a number average molecular weight (Mn) of 1256. The functionality of the B polymer was 2 hydroxy groups per mole and the block copolymer synthesis temperature ranged from about 215 to 234° C. The resulting polymeric composition had a Mn of 1861, a Mw of 8251, a Mz of 24510, an acid number (solid) of 131 and a Tg of −2/10° C. (onset/midpoint).

EXAMPLE 18

A polymeric composition was prepared in a manner similar to Example 16, except the B polymer was a polypropylene oxide (PPO 4000 available from Dow Chemical) having a number average molecular weight of 3479. The functionality of the B polymer was 2 hydroxy groups per mole. The polymeric composition synthesis temperature ranged from about 220 to 240° C. and toluene was employed as a solvent. The resulting polymeric composition had a Mn of 2520, a Mw of 17,340, a Mz of 45,190, an acid number (solid) of 62.89 and a Tg of −54/−46° C. (onset/midpoint).

EXAMPLE 19

A polymeric composition was prepared in a manner similar to Example 16, except the B polymer was a polytethylene oxide) (PEO 200 available from Dow Chemical) having a number average molecular weight of 377. The functionality of the B polymer was 2 hydroxy groups per mole. The polymeric composition synthesis temperature was between about 200 to 220° C. The resulting polymeric composition had a Mn of 1601, a Mw of 5219, a Mz of 15350, an acid number (solid) of 180.8 and a Tg of 59/67° C. (onset/midpoint).

EXAMPLE 20

A polymeric composition was prepared in a manner similar to Example 16, except the B polymer was a poly (ethylene oxide) (PEO 600 available from Dow Chemical) having a number average molecular weight of 882. The functionality of the B polymer was 2 hydroxy groups per mole. The polymeric composition was prepared at a synthesis temperature between about 200 to 220° C. The resulting polymeric composition had a Mn of 1819, a Mw of 6784, a Mz of 17,730, an acid number (solid) of 156.7 and as Tg of 18/27° C. (onset/midpoint).

EXAMPLE 21

A polymeric composition was prepared in a manner similar to Example 16, except the B polymer was a poly (propylene-β-ethylene oxide) (Pluronic 123, available from BASF) having a number average molecular weight of 4333. The functionality of the B polymer was about 2 hydroxy groups per mole. The polymeric composition synthesis temperature was between about 200 to about 230° C. The resulting polymeric composition had a Mn of 3074, a Mw of 23,710, a Mz of 46,970, an acid number (solid) of 50.2 and a Tg of −61/−53° C. (onset/midpoint).

A number of additional polymeric composition were prepared using the A polymers described in Table A and the B polymers described in Table B below.

TABLE A

| A Polymer | Composition | Functionality | AV* | Mn | Mw | Tg | FN |
|---|---|---|---|---|---|---|---|
| I | Styrene Acrylic[a] | carboxyl | 277 | 923 | 1637 | 45 | 4.56 |
| II | Styrene Acrylic[b] | carboxyl | 269 | 1116 | 1779 | 67 | 5.35 |
| III | STY/AA | carboxyl | 289 | 1000 | 1526 | 65 | 5.15 |
| IV | STY/AMS/AA | carboxyl | 264 | 1003 | 1512 | 71 | 4.72 |
| V | MMA/AA | carboxyl | 339 | 1121 | 1753 | 36 | 6.77 |
| VI | C-14 α-olefin MA$_n$ | anhydride | — | 2327 | — | — | 7.9 |
| VII | STY/MMA/GMA | epoxy | — | 2200 | — | — | 3.8 |
| VIII | Acrylic[c] | hydroxy | — | 1400 | — | — | 3.5 |
| IX | MMA/BA/HEA | hydroxy | — | 1180 | — | — | 5.28 |

[a]Joncryl 682 available from SC Johnson Polymer, Racine, Wisconsin
[b]Morez 300 available from Morton International, Chicago, Illinois
[c]Joncryl 569 available from SC Johnson Polymer
*Acid Value based on polymer solids
SYT—styrene; AA—acrylic acid; AMS—α-methylstyrene; MMA—methylmethacrylate; MA$_n$—maleic anhydride; GMA—glycidal methacrylate; BA—butyl acrylate; HEA—hydroxyethylacrylate

TABLE B

| B Polymer | Composition | Functionality | Mn | FN |
|---|---|---|---|---|
| I | Linear Polyester[a] | 1° Hydroxyl | 1000 | 2 |
| II | Branched Polyester[b] | 1° Hydroxyl | 900 | 3 |
| III | Linear Polyester | carboxyl | 1700 | 2 |
| IV | Linear Polyurethane | isocyanato | 2500 | 2 |
| V | Linear Dimer Acid Polyamide | 1° Amino | 4028 | 2 |
| VI | Linear Dimer Acid Polyamide | oxazolinyl | 3776 | 2 |
| VII | Linear Adipic Acid Nylon | 1° Amino | 1020 | 2 |
| VIII | Linear Polypropylene glycol[c] | 2° Hydroxyl | 425 | 2 |
| IX | Epoxy Resin[d] | Epoxy | 600 | 2 |
| X | Polyether Diamine[e] | 1° Amino | 600 | 2 |

[a]Rucoflex 1015-120 ® available from RUCO Polymer Corp, Hicksville, New York
[b]Tone 0310 ® available from Union Carbide Corp., Danbury, Connecticut
[c]Polyglycol P425 ® available from Dow Chemical Co., Midland, Michigan
[d]EPON 836 ® available from Shell Chemical Co., Houston, Texas
[e]Jeffamine ED 600 ® available from Huntsman Corp., Houston, Texas

EXAMPLE I

Preparation of a Polymeric Composition by Bulk Thermal Process

A 1000 ml four necked flask equipped with a stirrer, a nitrogen sparge tube, and a Dean Stark trap fitted with a condenser reactor was charged with 468 g of a styrene acrylic polymer having carboxyl functionality (A polymer I). This was heated to melt at 150–180° C. Then 140.4 g of a branched polyester polymer having a primary (1°) hydroxyl (B polymer II) was added to achieve a mole ratio of 3A:1B. The temperature was then raised to 220° C. and held till 8.4 g of water was removed. The product was then poured into a pan to cool. The final product is described in Table C.

EXAMPLES II–VI

A number of polymeric compositions were made in a manner substantially similar to Example I with a reaction temperature between 220–240° C. using A and B polymers as indicated in Table C below.

EXAMPLE VII

Preparation of a Polymeric Composition by a Solvent Reflux Process

A 1000 ml four necked flask equipped with a stirrer, a nitrogen sparge tube, and a Dean Stark trap fitted with a condenser was charged with 518.3 g with a methylmethacrylate polymer having carboxyl functionality (A polymer V). This was then heated to 150–180° C. to melt and agitation was started. Then 96.9 g of a linear polypropylene oxide having secondary (2°) hydroxyl functionality (B polymer VIII) and 13.6 g of methyl n-amyl ketone (MAK) were added. The reactor was then stage heated for 1 hour at 180° C., then one hour at 200° C. and finally one hour at 220° C. The product was then poured into a tray to cool. Using the water-MAK reflux, 10.6 g of water was removed.

EXAMPLES VIII and IX

Two polymeric compositions were made in a manner substantially similar to Example VII with the exception that MAK was replaced by xylene and the A and B polymers indicated in Table C were used.

EXAMPLE X

Preparation of a Polymeric Composition by a Solvent Process

A 1000 ml four necked flask equipped with a stirrer, a nitrogen blanket and a condenser was charged with 222.2g of a solution of 50% of a styrene/acrylic acid polymer having carboxyl functionality (A polymer III) and 50% diethylene glycol diethyl ether. After agitation was started, 277.8 g of a solution of 50% of a linear polyurethane polymer having isocyanato functionality (B polymer IV) and 50% diethylene glycol diethyl ether was added. After mixing 5 minutes, 0.25 g of Metacure T12 available from Air Products catalyst was added and the temperature raised to 65° C. and held there for 4 hours. The product was then poured into a quart jar and cooled.

EXAMPLES XI–XIV

Several polymeric composition were prepared in a manner substantially similar to Example X with reaction temperatures ranging from 125° C. to 190° C. using A and B polymers as indicated in Table C below.

The A polymer and B polymer constituents and properties of the resulting polymeric compositions for EXAMPLES I–XIV are set forth in Table C below.

TABLE C

| Example No. | A Polymer | B Polymer | Mole Ratio A:B | Wt. % B | Mn | Mw | Mz | Onset Tg | Functionality At End |
|---|---|---|---|---|---|---|---|---|---|
| I | I | II | 3:1 | 23 | 1703 | 9566 | 36210 | 18 | 153 AV |
| II | I | I | 2:1 | 29 | 1751 | 7506 | 22840 | −6 | 143 AV |
| III | I | VI | 2:1 | 66 | 2087 | 8369 | 22420 | ND | 70 AV |
| IV | I | V | 2:1 | 71 | 2982 | 11810 | 22430 | ND | 55 AV |
| V | VIII | III | 2:1 | 38 | 2609 | 62120 | 1,714,000 | ND | ND |
| VI | IV | VII | 2:1 | 34 | ND | ND | ND | 76 | 140 AV |
| VII | V | VIII | 2:1 | 16 | 1699 | 5996 | 18760 | 26 | 250 AV |
| VIII | I | VIII | 2:1 | 18 | 1292 | 3194 | 6696 | 26 | 176 AV |
| IX | II | VIII | 2:1 | 16 | 1534 | 4401 | 11220 | 38 | 173 AV |
| X | III | IV | 2:1 | 56 | 1385 | 4228 | 9618 | ND | ND |
| XI | VII | III | 2:1 | 33 | 2288 | 5590 | 10150 | ND | ND |
| XII | IX | IV | 2:1 | 53 | 2646 | 6411 | 17290 | −29 | ND |
| XIII | VI | X | 2:1 | 12 | ND | ND | ND | ND | 300 AV |
| XIV | IV | IX | 2:1 | 24 | 1485 | 5609 | ND | ND | 155 AV |

ND = NOT DETERMINED; AV = acid Value

Water Based Dispersants

EXAMPLE DSP1

To a 1 liter flask fitted with a stirrer and a condenser was added 494 g of deionized water and 284.3 g of the polyester polymer of example 8. Agitation was started and the temperature increased to 85° C. at the same time as 21.7 g of 28% aqueous ammonium hydroxide was added. The batch was held at 85° C. for about 2 hours and a clear dispersion of low viscosity was obtained. The percent solids was 35% and pH was 9.0.

EXAMPLE DSP2

To a 1 liter flask fitted with a stirrer and condenser was added 535.7 g of deionized water. The temperature was raised to 85° C. and then 20.7 g of 28% aqueous ammonium hydroxide was added. Right after the base addition, 243.6 g of polyamide from example 15 was added over 30 minutes. The mixture was held for one hour and a yellow-white dispersion free of nondispersed polymer was obtained. The percent solids was 30% and the pH was 9.9. The viscosity of the dispersion was 800 centipoise.

EXAMPLE DSP3

To a 1 liter flask fitted with a stirrer and a condenser was added 583.1 g of deionized water. The temperature was raised to 80° C. and 13.9 g of 28% aqueous ammonium hydroxide was added. To this was added 203.1 g of the polyether polymer from example 18 which has been melted at 100° C. The addition of the melted polymer to the base and water resulted in a clear solution almost immediately. The dispersion had a percent solids of 25% and a pH of 8.9.

EXAMPLES DSP4 to DSP5 and DSP-C

Three different aqueous dispersions were prepared. DSP-C was an aqueous control dispersion of Tamol 1124 available from Rohm & Haas, Philadelphia, Pa. having 50 wt. % non-volatiles. DSP4 was an aqueous polymeric dispersion of a polymeric composition of example 15 (styrene/acrylic A polymer (4) and polyamide B polymer (2)), neutralized with triethylamine and having 30 wt. % non-volatiles. DSP5 was an aqueous polymeric dispersion of a polymeric composition (produced from an acrylic A polymer (4) and a polyester B polymer produced by reacting 11/6/4 mole ratio of cyclohexane dimethanol/isophthalic acid/cyclohexane dicarbonylic acid) neutralized with ammonium hydroxide and having 35 wt. % non-volatiles.

The above described dispersions were used to prepare the grinds described in Table D.

TABLE D

| Components | Grind-C | Grind-1 | Grind-2 |
|---|---|---|---|
| propylene glycol | 21.6 | — | — |
| water | 45.8 | — | — |
| Dispersant DSP-C | 1.6 | — | — |
| Dispersant DSP-4 | — | 166.7 | — |
| Dispersant DSP-5 | — | — | 142.9 |
| Triton ® CF-10 | 2.5 | — | — |
| Proxel ® GXL | 0.5 | — | — |
| Arrtmanium Hydroxide | 0.7 | 0.7 | 0.7 |
| Dehydran ® 1620 | 0.6 | 0.6 | 0.6 |
| DSX-1550 | 0.5 | — | — |
| R-706 $TiO_2$ | 250 | 250 | 250 |
| Water | 5.0 | 10.0 | 8.5 |
| Butyl Cellosolve | — | — | 7.5 |
| Nonvolatiles, % | 77.2 | 70.1 | 71.4 |

Triton ® CF-10 is a dispersant available from Rham & Hass, Philadelphia, Pennsylvania
Proxel ® GXL is a preservative available from ICI, Wilmington, Delaware
Dehydran ® 1620 + DSX-1550 are thickeners available from Henkel, Amber, Pennsylvania
R-706 Ti-O2 - a pigment from DuPont de Nemours & Co., Wilmington, Delaware
All valves are in grams unless otherwise indicated The grinds were prepared by adding the pigment $TiO_2$ to the disperants with mixing and then dispersing at about 5000 rpm for 20 min. to 7.5 NS grind followed by the addition of additional water and any desired cosolvent.

Examples ADD-1 to ADD-4 and Comparisons ADD-CM-1 to ADD-CM-2.

The grinds prepared above were used to formulate latex polymeric coatings as paints. Paints were made using latexes SCX-1520 (an acrylic latex polymer available from S.C. Johnson Polymer, Sturtevant, Wis.) and Joncryl 77 (a styrene acrylic latex available from S.C. Johnson Polymeri Sturtevant, Wis.).

The formulations of Examples ADD-1 to ADD-4 and Comparisons ADD-CM-1 to ADD-CM-2 are set forth in Table ADD-A. The coatings were made on unpolished cold roll steel and air dried. These coatings were tested for various properties. The tests included gloss at 20° and 60° after 3 days and 7 days, water spot testing, methyl ethyl ketone rub resistance testing after air drying 7 days, (MEK/7), and for Konig hardness after air drying for 1 and 7 days (K1, K7, respectively). Tests on the coatings were also conducted using a 24 hr salt spray test. In this test, face rust (FR) was evaluated (10 (good) –0 (bad)); an x was scribed in the coated panel and the distance of rust creep (Crp) was measured; and a blister rating (Blst) was conducted (blister size is indicated numerically, F=few and D=dense). The results of the tests are set forth in Table ADD-B.

In addition, Chemical spot tests were performed and the results are shown in Tables ADD-C for gasoline and de-ionized water, ADD-D for sulfuric acid and muriatic acid, ADD-E for brake fluid and Formula 409® (an alcohol based cleaner available from the Clorox Co., Oakland, Calif.), and ADD-F for isopropanol and sodium hydroxide.

TABLE ADD-A

|  | ADD-CM-1 | ADD-1 | ADD-2 | ADD CM-2 | ADD-3 | ADD-4 |
|---|---|---|---|---|---|---|
| Latex | SCX-1520 | SCX-1520 | SCX-1520 | J-77 | J-77 | J-77 |
| % solids | 41.5 | 41.5 | 41.5 | 46.0 | 46.0 | 46.0 |
| Grind I.D.: | C | 1 | 2 | C | 1 | 2 |
| Grind amount: | 40.0 | 40.0 | 40.0 | 40.0 | 52.0 | 50.0 |
| Latex amount: | 115.6 | 115.6 | 115.6 | 113.0 | 113.0 | 113.0 |
| add under agitation: Taxanol @ 6% | 4.2 | 4.2 | 4.2 | 4.2 | 4.2 | 4.2 |
| 5% Sodium Nitrite | 2.2 | 2.2 | 2.2 | 2.2 | 2.2 | 2.2 |
| DSX1514, 50% aq | 1.0 | 1.0 | 1.0 | 1.0 | 1.0 | 1.0 |
| Total: | 172.7 | 172.7 | 172.7 | 160.4 | 172.4 | 170.4 |
| % Solids before adjustment: | 48.4 | 48.4 | 48.4 | 52.1 | 53.8 | 53.5 |

DSX1514 - thickener available from Henkel, Amber, PA.
Texanol - an ester solvent available from Eastman Chemical, Kingsport, TN

TABLE ADD-B

|  | GLOSS | | | | Wspot, 24 h dry | | | | | | | |
|---|---|---|---|---|---|---|---|---|---|---|---|---|
|  | 20° 3 Day | 60° 3 Day | 20° 7 Day | 60° 7 Day | Sw/Sft/Bl/color | MEK/7 | K1 | K7 | DFT | FR | Crp | Blst |
| ADD-CM-1 | 73 | 90 | 72 | 90 | 8/4/10/10 | 13/33 | 26 | 41 | 1–1.4 | 1 | 1/16" | 6D |
| ADD-1 | 71 | 88 | 70 | 88 | 10/3/6D/10 | 11/21 | 52 | 54 | " | 1 | 1/16" | 6D |
| ADD-2 | 60 | 85 | 61 | 85 | 8/10/10/10 | 15.29 | 43 | 49 | " | 1 | 1/18" | 6D |
| ADD-CM-2 | 83 | 94 | 80 | 92 | 7/4/10/10 | 10/19 | 14 | 23 | " | 1 | 1/8" | 6D |
| ADD-3 | 16 | 57 | 16 | 56 | 10/4/4MD/10 | 8/25 | 23 | 27 | " | 1 | 1/8" | 6D |
| ADD-4 | 67 | 89 | 67 | 88 | 9/3/2F/10 | 11/22 | 25 | 30 | " | 1 | 1/8" | 6D |

Wspot = water spot test; Sw = swelling; Sft = softening; Bl = blistering;
MEK = Methyl ethyl ketone rub resistance test
DFT = dry film thickness
FR = face rust
Crp = creep
Blst = blister rating

TABLE ADD-C

| 7 day dry [Swell/Soft/Blister/Color] | | | | | | | |
|---|---|---|---|---|---|---|---|
| 24 h/Gasoline | | | | 24 h/Dl Water | | | |
| sw | s | bl | clr | SW | s | bl | clr |
| ADD-CM-1 | | | | | | | |
| 8 | 0 | 10 | 8 | 9 | 9 | 10 | 9 |
| ADD-1 | | | | | | | |
| 9 | 0 | 10 | 9 | 9 | 9 | 8 VF | 10 |

TABLE ADD-C-continued

| 7 day dry [Swell/Soft/Blister/Color] | | | | | | | |
|---|---|---|---|---|---|---|---|
| 24 h/Gasoline | | | | 24 h/Dl Water | | | |
| sw | s | bl | clr | SW | s | bl | clr |
| ADD-2 | 9 | 0 | 10 | 8 | 8 | 8 | 10 | 10 |
| ADD-CM-2 | 10 | 1 | 10 | 9 | 9 | 5 | 10 | 5 |
| ADD-3 | 10 | 1 | 10 | 9 | 9 | 6 | 10 | 8 |
| ADD-4 | 10 | 1 | 10 | 9 | 9 | 6 | 4 F | 7 |

Sw = swell
VF = very few
S = soft
F = few
bl = blister
clr = color

TABLE ADD-D

| 7 day dry [Swell/Soft/Blister/Color] | | | | | | | |
|---|---|---|---|---|---|---|---|
| 24th/5% $H_2SO_4$ | | | | 24th/Mur. Acid | | | |
| sw | s | bl | clr | SW | s | bl | clr |
| ADD-CM-1 | 10 | 10 | 10 | 10 | 9 | 4 | 10 | 10 |
| ADD-1 | 10 | 10 | 10 | 10 | 9 | 6 | 10 | 10 |
| ADD-2 | 10 | 10 | 10 | 10 | 9 | 8 | 10 | 10 |
| ADD-CM-2 | 10 | 8 | 10 | 10 | 9 | 1 | 10 | 10 |
| ADD-3 | 10 | 9 | 10 | 10 | 10 | 2 | 10 | 8 |
| ADD-4 | 10 | 10 | 10 | 10 | 9 | 9 | 10 | 10 |

Sw = swell
s = soft
bl = blister
clr = color

TABLE ADD-E

| 7 day dry [Swell/Soft/Blister/Color] | | | | | | | |
|---|---|---|---|---|---|---|---|
| 24 h/Brake Fluid | | | | 24 h/Formula 409 | | | |
| sw | s | bl | clr | SW | s | bl | clr |
| ADD-CM-1 | 0 | 0 | 0 | 0 | 0 | 0 | 0 | 0 |
| ADD-1 | 0 | 0 | 0 | 0 | 0 | 0 | 0 | 0 |

TABLE ADD-E-continued

| | 7 day dry [Swell/Soft/Blister/Color] | | | | | | |
|---|---|---|---|---|---|---|---|
| | 24 h/Brake Fluid | | | | 24 h/Formula 409 | | |
| | sw | s | bl | clr | SW | s | bl | clr |
| ADD-2 | 0 | 0 | 0 | 0 | 0 | 0 | 0 | 0 |
| ADD-CM-2 | 0 | 0 | 0 | 0 | 10 | 3 | 10 | 10 |
| ADD-3 | 0 | 0 | 0 | 0 | 10 | 7 | 10 | 10 |
| ADD-4 | 0 | 0 | 0 | 0 | 0 | 0 | 0 | 0 |

Sw = swell
s = soft
bl = blister
clr = color

TABLE ADD-F

| | 7 day dry [Swell/Soft/Blister/Color] | | | | | | | |
|---|---|---|---|---|---|---|---|---|
| | 24 h/1 PAlc | | | | 24 h/5% NaOH | | | |
| | sw | s | bl | clr | SW | s | bl | clr |
| ADD-CM-1 | 10 | 10 | 10 | 10 | 10 | 10 | 8 MD | 10 |
| ADD-1 | 10 | 10 | 10 | 10 | 10 | 10 | 8 D | 10 |
| ADD-2 | 10 | 10 | 10 | 10 | 10 | 10 | 8 F | 9 |
| ADD-CM-2 | 10 | 7 | 10 | 10 | 9 | 3 | 8 D | 8 |
| ADD-3 | 10 | 10 | 10 | 10 | 10 | 5 | 10 | 9 |
| ADD-4 | 10 | 10 | 10 | 10 | 0 | 0 | 0 | 0 |

Sw = swell
D = dense
s = soft
F = few
bl = blister

TABLE ADD-F-continued

| | 7 day dry [Swell/Soft/Blister/Color] | | | | | | | |
|---|---|---|---|---|---|---|---|---|
| | 24 h/1 PAlc | | | | 24 h/5% NaOH | | | |
| | sw | s | bl | clr | SW | s | bl | clr |

MD = medium dense
clr = color

As can be seen from the results the aqueous coating compositions of the present invention performed as well as the coating composition containing the control dispersant in a great number of the tests and surpassed the control on several tests.

Water Based Coatings

EXAMPLES WBC-1 TO WBC-3 AND WBC-CM-1

Three aqueous dispersions of the present invention were prepared as clear coatings. The dispersions were made by the addition of the polymeric composition described in Table WBC-A to water without the use of an emulsifier. Each solution was then neutralized by the addition of the indicated base (28% aqueous ammonium hydroxide) or both ammonium hydroxide and triethylamine (TEA) in amount sufficient to neutralize the carboxylic acid groups of the polymeric composition. They were compared to a standard latex coating formulation. The test results are tabulated in Table WBC-A.

The film properties of the coatings formed by the aqueous dispersions were tested and the results are set forth in Table WBC-A. The ratings were made on a scale from 0 to 5, with 5 being the best.

TABLE WBC-A

| SAMPLE ID | WBC-1 | WBC-2 | WBC-3 | WBC-CM-1 |
|---|---|---|---|---|
| Polym. Comp. | Example 15 | Example 15 | Example 14 | JONCRYL 77 |
| OTHER | NH$_4$OH | NH$_4$OH | NH$_4$OH | |
| | | 20% TEA | 10% TEA | |
| LATEX | (ALL RESIN SOLUTION -NO LATEX) | | | |
| RESIN LEVEL - % | 100 | 100 | 100 | |
| pH | 9.92 | 9.66 | 9.5 | 8.3 |
| VISCOSITY - cps | 800 | 100 | 100 | 510 |
| NON-VOLATILE - % | 30 | 30.10 | 30 | 46 |
| WATER ADD - % | 11% | NONE | 12% | 10 |
| VISCOSITY - cps | 110 | 100 | 110 | 85 |
| NON-VOLATILE - % | 26.7 | 30.1 | 26.4 | 41.& |
| CHEMICAL RESISTANCE | | | | |
| DRAW DOWNS MADE ON N2A LENETA STOCK WITH K-COATER #1 @ 6 | | | | |
| ALL SAMPLES DRIED 2 MIN @ RT/1 MIN @ 140° F. - TESTED AFTER 16 HRS | | | | |
| WETTING | 4 | 3 | 3.5 | 4 |
| LEVELING | 3.5 | 3 | 3 | 3.5 |
| HOLDOUT | 3 | 2.5 | 2.5 | 2.5 |
| 60° GLOSS | | | | |
| BLACK | 71.1 | 71.1 | 69.3 | 71.5 |
| WHITE | 44.4 | 36.5 | 38.2 | 27 |
| WATER RESISTANCE | | | | |
| 1 MIN SPOT TEST | 5 | 5 | 5 | 5 |
| 5 MIN SPOT TEST | 5 | 5 | 5 | 5 |
| 10 MIN SPOT TEST | 5 | 5 | 5 | 5 |
| 30 MIN SPOT TEST | 5 | 5 | 5 | 5 |
| 5% NaOH | | | | |
| 1 MIN SPOT TEST | 4 | 4 | 4 | 3 |
| 5 MIN SPOT TEST | 3.5 | 3.5 | 3.5 | 2.5 |

TABLE WBC-A-continued

| SAMPLE ID | WBC-1 | WBC-2 | WBC-3 | WBC-CM-1 |
|---|---|---|---|---|
| 10 MIN SPOT TEST | 3 | 3 | 2 | 2 |
| 30 MIN SPOT TEST | 1 | 1 | 1 | 1.5 |
| | IPA/WATER (1/1) | | | |
| 1 MIN SPOT TEST | 5 | 5 | 5 | 5 |
| 5 MIN SPOT TEST | 5 | 5 | 5 | 5.0* |
| 10 MIN SPOT TEST | 5 | 5.0* | 5 | 4.0* |
| 30 MIN SPOT TEST | 4 | 4.0* | 3.5 | 3.5* |
| | ETHANOL/WATER (1/1) | | | |
| 1 MIN SPOT TEST | 5 | 5 | 5 | 5 |
| 5 MIN SPOT TEST | 5 | 5 | 5 | 5 |
| 10 MIN SPOT TEST | 5 | 5 | 4 | 4 |
| 30 MIN SPOT TEST | 5 | 5 | 4 | 3.0* |
| | 409 CLEANER | | | |
| 1 MIN SPOT TEST | 3 | 3 | 3 | 3 |
| 5 MIN SPOT TEST | 2.5 | 2.5 | 2.5 | 2.5 |
| 10 MIN SPOT TEST | 2 | 2 | 2 | 2 |
| 30 MIN SPOT TEST | 1.5 | 1.5 | 1.5 | 1.5 |
| | DRAW DOWNS ON INKED 10 pt. TECH SERVICE STOCK WITH K-COATER #1 @ 10 ALL SAMPLES DRIED 2 MIN @ RT/1 MIN @ 140° F. - TESTED AFTER 16 HOURS | | | |
| WETTING | 4 | 4 | 4 | 4 |
| LEVELING | 3.5 | 3.5 | 3.5–4 | 3.5 |
| HOLDOUT | 4 | 4 | 4 | 4 |
| | 60° GLOSS | | | |
| AVE OF 5 | 36.6 | 38.8 | 39.1 | 36.6 |
| TEMP/REL. HUMIDITY | 70° f/50% | 70° F./50% | 70° F./50% | 70° F./50% |
| | STATIC SLIDE ANGLE | | | |
| JEM - 3.5# SLED | 32.7/32.6 | 30.6/32.1 | 27.8/30.6 | 30.1/32.5 |
| FACE/FACE | 33.0/32.2 | 31.3132.2 | 33.2/33.6 | 33.2/33.6 |
| 1ST 5 READINGS | 33.2–32.5 | 31.2 = 31.5 | 33.1 = 31.7 | 30.4 = 32.0 |
| AOS VARIATION - SPREAD | 0.8 | 1.6 | 5.8 | 3.5 |
| | SUTHERLAND RUB FACE/FACE/ w/4# SLED | | | |
| 100 CYCLES | 1.5 | 1.5 | 1.5 | 1.5 |
| 200 CYCLES | 0.5 | 0.5 | 0.5 | 1 |
| | BLOCK RESISTANCE 140° f/125 PSI/16 HRS | | | |
| FACE/FACE - DRY | 2.5 | 2.5 | 4 | 3 |
| | WATER TEST - 1 DROP | | | |
| FACE/FACE- WET FACE | 0 | 0 | 0 | 0.5 |
| FACE/FACE - WET BACK | 0 | 0 | 0 | 0 |

*Film Whitened
Joncryll 77—is a styrene acrylic latex available from S. C. Johnson Polymer, Sturtevant, Wisconsin.

As the results show, the coatings formed with the aqueous dispersions of the present invention compare well with the control latex without the necessity of any added cost latex component. The coatings exhibited improved gloss and resistance, compared to the standard latex coating despite having much lower solids in the aqueous dispersions. Thus, the aqueous dispersions of the present invention offers advantageous reductions in cost and processing complexities.

EXAMPLES WBC-4 TO WBC-6

The polymeric compositions of Examples 16, 17 and 18 were used to prepare aqueous dispersions of ammoniated polymeric dispersions. The aqueous dispersions were prepared by the addition of water and neutralization with ammonium hydroxide, i.e., an effective amount of ammonium hydroxide was added to substantially neutralize the carboxylic acid groups on the polymeric compositions.

The properties of the aqueous solutions were evaluated as overprint varnishes by drawing down each composition on Lanetta Cards. Table WBC-B contains data on solids, viscosity, gloss, chemical resistance, slide angle, rub resistance and block resistance for the coatings obtained from these aqueous polymeric compositions.

TABLE WBC-B

| Example | WBC-4 | WBC-5 | WBC-6 |
|---|---|---|---|
| Solids (wt %) | 27 | 27 | 25 |
| Viscosity (cps) | 42 | 24 | 12.5 |
| Gloss | | | |
| (Black) | 76 | 78 | 80 |
| (White) | 72 | 75 | 71 |
| Chemical Resistance | | | |
| Water | 5.0 | 5.0 | 5.0 |
| NaOH 5% aq. | 0.9 | 0.9 | 2.4 |
| IPA 50% aq. | 4.0 | 2.3 | 5.0 |
| EtOH 50% aq. | 4.0 | 2.0 | 5.0 |
| 409 ® Cleaner‡ | 0.8 | 1.0 | 1.5 |
| Slide Angle | | | |
| degrees | 42 | 34 | tacky |
| (spread) | 4.2 | 1.4 | — |
| Rub Resistance | | | |
| 100 cycles | 1.5 | 1.0 | tacky |
| 200 cycles | 1.0 | .05 | tacky |
| Block Resistance | | | |
| dry | 1.0 | 4.0 | tacky |
| wet (face) | 0 | 0 | tacky |
| wet (back) | 0 | 0 | tacky |

*tested area whitened
‡409 cleaner is an alcohol based cleaner available from Clorox Co., Oakland, CA.

These test results show, for example, that the aqueous solution of WBC-5 containing a polymeric composition prepared from PPO 1000 exhibited, despite having low solids, good gloss, water resistance, slide angle and dry block resistance. The results also show that variation of the B polymer of the polymeric composition may be employed to derive desired characteristics in the aqueous polymeric solutions of this invention.

Clear Coatings for Olefin Films

The aqueous polymeric dispersions of this invention may be formualted to form a clear, non-tacky, and continuous polymer film having improved adhesion to thermoplastic films, more particularly to oriented polypropylene thermoplastic film, where the surface of the oriented polypropylene film has been oxidized preferably by Corona treatment before coating with the polymeric dispersion. Typically, the polymeric composition is dispersed in an aqueous ammonium hydroxide solution containing up to about 20% combustible amine on solid polymeric composition. The combustible amine has a boiling point from about 100° C. to about 150° C. Such an amine is dimethylaminoethanol. The polymeric dispersion coated polypropylene film can be coated with other aqueous or solvent borne polymers used to improve water and oxygen barrier properties of said polypropylene film for making packaging and wrapping materials. An example of one useful coating is an acrylic-vinylidene chloride copolymer emulsion commonly referred to as PVdC copolymer emulsion.

EXAMPLE DC1

The polymeric composition of Example 14 was dissolved in ammonia-water solution to yield a 30.2% actives polymeric dispersion having a pH of about 9.

EXAMPLE DC2

The polymeric composition of Example 14 was dissolved in ammonia-water solution to yield a 30.2% actives dispersion having a pH of about 9. Next, 4.3% dimethylaminoethanol was added to complete the polymeric dispersion.

EXAMPLE DC3

The polymeric composition substantially similar to Example 14, but with B polymer from Example 7, was dissolved in ammonia-water solution to yield a 30.2% actives dispersion having a pH of about 9. The polymeric dispersion was completed by adding 4.3% dimethylaminoethanol.

EXAMPLE DC4

The polymeric composition of Example 14 was dissolved in ammonia-water solution to yield a 30.2% actives dispersion having a pH of about 9. The polymeric composition was completed by adding 4.3% triethyl amine.

Examples DC1 to DC4 were used to coat two samples of Corona treated ordered polypropylene having a different surface energy. The surface energy of polypropylene A measured 34 dynes/cm and polypropylene B measured 42 dynes/cm by ASTM standard D2578-67. A 6 micron wet film of each of Examples DC1 to DC4 was applied by rod onto polypropylene A and B. The coatings were dried for 30 seconds at 50° C. Adhesion of the coatings was tested by affixing a Scotch brand tape #610 to the dried coating and quickly removing the tape in the direction the film was applied. Adhesion of the coating to the polypropylene was rated as failure when any part of the coating was removed by the tape and pass when the coating could not be removed by the tape. Table CC summarizes the results.

TABLE CC

Tape Adhesion to Polypropylene

| Example No. | Adhesion to Polypropylene (Pass/Fail) | |
|---|---|---|
| | 34 dy/cm[1] | 42 dy/cm[1] |
| DC1 | F | P |
| DC2 | P | P |
| DC3 | P | P |
| DC4 | F | P |

Emulsion Polymers

EXAMPLE EP1

First, an aqueous dispersion of a polymeric composition made from 2 moles of A polymer (4) and 1 mole of a B polymer (prepared from a 2/1/2 molar ratio of Dimer Acid/ethylene diamine/Dytek A) was prepared having 30% solids and 80% DN of 112 acid value. Next, 254 g of the aqueous dispersion, 142.5 g of deionized water, 7.7 g of Tergitol® 15 S 12 (90) (a surfactant available from Union Carbide, Danbury, Conn.), and 18 g of ammonium hydroxide were charged to an emulsion polymerization reactor. The reactor temperature was raised to 75° C. and 1.75 g of ammonium persulfate in 33.25 g of deionized water was added. Next, 138.6 g of styrene and 92.4 g of 2-ethyl hexyl acrylate were fed to the reactor. The resulting emulsion polymer had a pH of 9.04, a percent non-volatiles level of 45.08 and a viscosity of 52 cps.

EXAMPLE EP2

An emulsion polymer was prepared using an 30% aqueous dispersion (85 DN of 75 acid value) of the polymeric composition of Example 15. To an emulsion polymerization reactor were charged 254.8 g of the aqueous dispersion, 141.5 g of deionized water, 7.7 g of Tergitol® 15 S 12 (90) and 2 g of ammonium hydroxide. The temperature of the reactor was raised to 75° C. and 1.75 g of ammonium persulfate in 33.25 g of deionized water was added. Next, 138.6 g of styrene and 92.4 g of 2-ethyl hexyl acrylate were fed to the reactor. The resulting emulsion polymer had a a non-volatiles level of 45.11, a pH of 9.45 and-a viscosity of 200 cps.

EXAMPLE EP3

An emulsion polymer was prepared by charging 271 g of the aqueous dispersion used in Example EP2, 165.1 g of deionized water, 7.7 g of Tergitol® 15 S 12 (90) and 2.1 g of ammonium hydroxide to an emulsion polymerization reactor. The mixture was heated to 75° C., and 1.75 g of ammonium persulfate in 33.25 g of deionized water was added, followed by feeding 114.7 g of styrene and 76.4 g of 2-ethyl hexyl acrylate to the reactor. The resulting emulsion polymer had a % non-volatiles level of 40.0, a pH of 9.46 and a viscosity of 40 cps.

EXAMPLE EP4

An emulsion polymer was prepared by charging 203.8 g of the aqueous dispersion used in Example EP2, 177.5 g of deionized water, 7.7 g of Tergitol® 15 S 12 (90) and 1.6 g of ammonium hydroxide to an emulsion polymerization reactor. The mixture was heated to 75° C and 1.75 g of ammonium persulfate in 33.25 g of deionized water was added, followed by feeding 147.8 g of styrene and 98.6 g of 2-ethyl hexyl acrylate to the reactor. The resulting emulsion polymer had a % non-volatiles level of 44.97, a pH of 9.86 and a viscosity of 210 cps.

EXAMPLE EP5

First, a 35% solids aqueous dispersion of a polymeric composition made from 2 moles of A polymer (4) and 1 mole of B polymer (a polyester prepared with a 11/6/4 molar ratio of cyclohexane dimethanol, isophthalic acid and cyclohexane dicarboxylate) was prepared. Next, 234.4 g of the aqueous dispersion, 200.6 g of deionized water, 7.7 g of Tergitol® 15 S 12 (90) and 3.1 g of ammonium hydroxide were added to an emulsion polymerization reactor. The reactor contents were heated to 75° C. and 1.75 g of ammonium persulfate in 33.25 g of deionized water was added, followed by feeding 114.7 g of styrene and 76.4 g of 2-ethyl hexyl acrylate to the reactor. The resulting emulsion polymer had a % non-volatiles level of 40.01, a pH of 9.2 and viscosity of 140 cps.

EXAMPLE EP6

An emulsion polymer was prepared using a 30% aqueous dispersion of Example 6 (74% DN of 92 acid value). An emulsion polymerization reactor was charged with 257.2 g of the aqueous dispersion, 138.3 g of deionized water, 22 g of Tergitol® 15 S 12 (90) and 2.8 g of ammonium hydroxide. The reactor contents were heated to 75° C., and 1.73 g of ammonium persulfate in 33.25 g of deionized water was added, followed by feeding 138.6 g of styrene and 92.4 g of 2-ethyl hexyl acrylate to the reactor. The resulting emulsion polymer had a % non-volatiles level of 45.06, a pH of 9.1 and a viscosity of 95 cps.

EXAMPLE EP7

An emulsion polymer was prepared using a 30% aqueous dispersion of the polymeric composition of Example 18. An emulsion polymerization reactor was changed with 262.5 g of the aqueous dispersion, 139.8 g of deionized water and 7 g of Tergitol® 15 S 12. The reactor contents were heated to 75° C, and 1.72 g of ammonium persulfate in 32.7 g of deionized water was added, followed by feeding 136.9 g of styrene and 91.3 g of 2-ethyl hexyl acrylate to the reactor. The resulting emulsion polymer had a a non-volatile level of 43.6, a pH of 9.1 and a viscosity of 45.1 cps. The % polymeric composition used as a support resin for this emulsion polymer was 25%.

EXAMPLE EP8

An emulsion polymer was prepared using a 30% aqueous dispersion of the polymeric composition of Example 18. An emulsion polymerization reactor was charged with 210 g of the aqueous dispersion, 176.1 of deionized water and 7 g of Tergitol® 15 S 12. The reactor contents were heated to 75° C., and 1.72 g of ammonium persulfate in 33.2 g of deionized water was added, followed by feeding 146.4 g of styrene and 97.6 of 2-ethyl hexyl acrylate. The resulting emulsion polymer had a % non-volatiles level of 43.9, a pH of 8.9 and a viscosity of 24 cps. The % polymeric composition used as a support resin for this emulsion polymer was 20%.

EXAMPLE EP9

An emulsion polymer was prepared using a 30% aqueous dispersion of the polymeric composition of Example 18. An emulsion polymerization reactor was charged with 315 g of the aqueous dispersion, 102.5 g of deionized water and 7 g of Tergitol® 15 S 12. The reactor contents were heated to 75° C., and 1.75 g of ammonium persulfate in 33.3 g of deionized water was added, followed by feeding 127.5 g of styrene and 85 g of 2-ethyl hexyl acrylate. The resulting emulsion polymer had a % non-volatiles level of 43.4, a pH of 9.1 and a viscosity of 31.1 cps. The % polymeric composition used as a support resin for this emulsion polymer was 30%.

EXAMPLE EP10

An emulsion polymer was prepared in a manner substantially similar to Example EP9, with the exception that a 30% aqueous dispersion of the polymeric composition of Example 17 was used. The resulting emulsion polymer had a % non-volatiles level of 43.1. The % polymeric composition used as a support resin for this emulsion polymer was 30%.

EXAMPLE EP11

An emulsion polymer was prepared in a manner substantially similar to Example EP9, with the exception that a 30% aqueous dispersion of the polymeric composition of Example 16 was used. The resulting emulsion polymer had a % non-volatiles level of 43.3, a pH of 9.3 and a viscosity of 51.1 cps. The % polymeric composition used as a support resin for this emulsion polymer was 30%.

Overprint Varnishes

EXAMPLES OPV-1 TO OPV-7 AND COMPARISON EXAMPLE OPV-CM-1.

Latex overprint varnishes were made with the emulsion polymers prepared above and compared with a standard latex overprint varnish. The comparison example was Joncryl 77 (a styrene acrylic latex available from S.C. Johnson Polymer, Sturtevant, Wis.).

The resulting emulsions were coated onto N2A LENETA Stock with a K-coater #1 at 6. The coatings were dried for 2 minutes at 140° F. (60° C.) and tested after 16 hours. The results are shown in Tables OPV-A and OPV-B. The test ratings were on a scale from 0 to 5, where 5 is best.

As can be seen from the results, the emulsion overprint varnishes using the emulsion polymers of the present invention performed comparably to the comparison latex formulation.

TABLE OVP-A

| SAMPLE ID | DPV-CM-1 | OPV-1 | OPV-2 | OPV-3 | OPV-4 |
|---|---|---|---|---|---|
| RESIN TYPE | Joncryl 77 | EP1 | EP2 | EP4 | EP4 |
| RESIN LEVEL - % | | 25 | 25 | 20 | 30 |
| pH | 8.3 | 9.04 | 9.45 | 9.36 | 9.52 |
| VISCOSITY - cps | 510 | 52 | 200 | 210 | 45 |
| NON-VOLATILE - % | 46 | 45.3 | 45.2 | 45 | 42.4 |
| WATER ADD - % | 10 | NONE | 3.50% | 3.00% | NONE |
| VISCOSITY - cps | 85 | 52 | 110 | 100 | 45 |
| NON-VOLATILE - % | 41.8 | 45.3 | 43.6 | 43.7 | 42.4 |
| CHEMICAL RESISTANCE | | | | | |
| Draw downs on N2A LENETA Stack with K-coater #1 @ 6 | | | | | |
| Samples dried 2 min @ RT/1 min @ 140° F. - tested after 16 hrs | | | | | |
| WETTING | 4 | 4 | 3.5 | 2.5 | 3.5 |
| LEVELING | 3.5 | 3.5 | 3.5 | 3.5 | 3 |
| HOLDOUT | 2.5 | 2.5 | 2 | 2.5 | 2.5 |
| 60° GLOSS | | | | | |
| BLACK | 71.5 (83) | 74.7 | 74.5 | 77.6 | 78.1 |
| WHITE | 27 (34) | 28.7 | 23.9 | 31.3 | 30 |
| WATER RESISTANCE | | | | | |
| 1 MIN SPOT TEST | 5 | 5 | 5 | 5 | 5 |
| 5 MIN SPOT TEST | 5 | 5 | 5 | 5 | 5 |
| 10 MIN SPOT TEST | 5 | 5 | 5 | 5 | 5 |
| 30 MIN SPOT TEST | 5 | 5 | 5 | 5 | 5 |
| 5% NaOH | | | | | |
| 1 MIN SPOT TEST | 3 | 3.5 | 4 | 4 | 4.5 |
| 5 MIN SPOT TEST | 2.5 | 3 | 3.5 | 3.5 | 4 |
| 10 MIN SPOT TEST | 2 | 1.5 | 2 | 2 | 2 |
| 30 MIN SPOT TEST | 1.5 | 1 | 1 | 1 | 1 |
| IPA/WATER (1/1) | | | | | |
| 1 MIN SPOT TEST | 5 | 5.0* | 5.0* | 5 | 5 |
| 5 MIN SPOT TEST | 5.0* | 5.0* | 5.0* | 5.0* | 5.0* |
| 10 MIN SPOT TEST | 4.0* | 5.0* | 4.0* | 5.0* | 5.0* |
| 30 MIN SPOT TEST | 3.5* | 4.0* | 3.5* | 5.0* | 5.0* |
| ETHANOL/WATER (1/1) | | | | | |
| 1 MIN SPOT TEST | 5 | 5 | 5 | 3 | 5 |
| 5 MIN SPOT TEST | 5 | 5.0* | 5 | 5 | 5 |
| 10 MIN SPOT TEST | 4 | 4.0* | 5 | 4 | 4 |
| 30 MIN SPOT TEST | 3.0* | 3.5* | 3.5 | 3.5 | 3.5 |
| 409 CLEANER ™ | | | | | |
| 1 MIN SPOT TEST | 3 | 3 | 3 | 4 | 3.5 |
| 5 MIN SPOT TEST | 2.5 | 2.5 | 2.5 | 3 | 3 |
| 10 MIN SPOT TEST | 2 | 2 | 2 | 2.5 | 2 |
| 30 MIN SPOT TEST | 1.5 | 1.5 | 1.5 | 1.5 | 1.5 |
| Draw downs made on inked 10 pt. Tech Service Stock with K-Coater #1 @ 10 | | | | | |
| Samples dried 2 min @ RT/1 min @ 140° F. - Tested after 16 hrs | | | | | |
| WETTING | 4 | 4 | 3.5 | 3.5 | 4 |
| LEVELING | 3.5 | 3 | 3 | 3 | 3 |
| HOLDOUT | 4 | 4 | 4 | 4 | 4 |
| 60° GLOSS | | | | | |
| AVE OF 5 | 36.6 | 32.8 | 29.6 | 34.2 | 33.8 |
| TEMP/REL. HUMIDITY | 70° F./50% | 70°/50% | 70° F./50% | 70° F./50% | 70° F./50% |
| STATIC SLIDE ANGLE | | | | | |
| JEM - 3.5# SLED | 30.1/32.8 | 33.1/36.1 | 36.1/38.2 | 34.0/31.8 | 38.7/41.4 |
| FACE/FACE | 33.2/33.6 | 40.9/40.3 | 44.4/38.8 | 34.2/32.2 | 41.6/39.5 |
| 1ST 5 READINGS | 30.4–32.0 | 39.4–38.0 | 44.7–41.4 | 32.9–33.0 | 40.4–40.3 |
| AOS VARIATION - SPREAD | 3.5 | 7.8 | 8.6 | 2.4 | 2.9 |
| SUTHERLAND RUB | | | | | |
| FACE/FACE/ w/4# SLED | | | | | |

TABLE OVP-A-continued

| SAMPLE ID | DPV-CM-1 | OPV-1 | OPV-2 | OPV-3 | OPV-4 |
|---|---|---|---|---|---|
| 100 CYCLES | 1.5 | 2.5 | 2.5 | 2.5 | 2 |
| 200 CYCLES | 1 | 1.5 | 1.5 | 1.5 | 1 |
| BLOCK RESISTANCE | | | | | |
| 140° F./125 PSI/16 HRS | | | | | |
| FACE/FACE - DRY | 3 | 1.5 | 2 | 1.5 | 1.5 |
| WATER TEST - 1 DROP | | | | | |
| FACE/FACE - WET FACE | 0.5 | 0 | 0 | 0 | 0 |
| FACE/FACE - WET BACK | 0 | 0 | 0 | 0 | 0 |

*Film Whitened

TABLE OPV-B

| SAMPLE ID | OPV-5 | OPV-6 | OPV-7 |
|---|---|---|---|
| RESIN TYPE | EP3 | EP5 | EP6 |
| RESIN LEVEL - % | 30 | 30 | 25 |
| pH | 9.46 | 9.2 | 9.1 |
| VISCOSITY - cps | 40 | 140 | 95 |
| NON-VOLATILE - % | 40 | 40.2 | 45.2 |
| WATER ADD - % | NONE | 1.50% | NONE |
| VISCOSITY - cps | 40 | 110 | 95 |
| NON-VOLATILE - % | 40 | 39.6 | 45.2 |
| CHEMICAL RESISTANCE | | | |
| Draw dawns made on N2A LENETA Stock with K-Coater #1 @ 6 | | | |
| Samples dried 2 min @ RT/1 min @ 140° F. - Tested after 16 hrs | | | |
| WETTING | 4 | 3 | 3.5 |
| LEVELING | 3.5 | 3 | 3 |
| HOLDOUT | 2.5 | 2.5 | 2.5 |
| 60° GLOSS | | | |
| BLACK | 78.2 | 74 | 71.8 |
| WHITE | 36 | 34.3 | 27.8 |
| WATER RESISTANCE | | | |
| 1 MIN SPOT TEST | 5 | 5 | 5 |
| 5 MIN SPOT TEST | 5 | 5 | 5 |
| 10 MIN SPOT TEST | 5 | 5 | 5 |
| 30 MIN SPOT TEST | 5 | 5 | 5 |
| 5% NaOH | | | |
| 1 MIN SPOT TEST | 4 | 4 | 4.5 |
| 5 MIN SPOT TEST | 3.5 | 3.5 | 3.5 |
| 10 MIN SPOT TEST | 2.5 | 2.5 | 2.5 |
| 30 MIN SPOT TEST | 1.5 | 1 | 1 |
| IPA/WATER (1/1) | | | |
| 1 MIN SPOT TEST | 5.0* | 5.0* | 5 |
| 5 MIN SPOT TEST | 5.0* | 5.0* | 5.0* |
| 10 MIN SPOT TEST | 5.0* | 4.0* | 5.0* |
| 30 MIN SPOT TEST | 4.0* | 3.5* | 4.0* |
| ETHANOL/WATER (1/1) | | | |
| 1 MIN SPOT TEST | 5 | 5 | 5 |
| 5 MIN SPOT TEST | 5 | 5.0* | 5.0* |
| 10 MIN SPOT TEST | 5 | 5.0* | 5.0* |
| 30 MIN SPOT TEST | 4 | 4.0* | 3.5* |
| 409 CLEANER | | | |
| 1 MIN SPOT TEST | 3 | 3 | 3 |
| 5 MIN SPOT TEST | 2.5 | 2.5 | 2.5 |
| 10 MIN SPOT TEST | 2 | 2 | 2 |
| 30 MIN SPOT TEST | 1.5 | 1.5 | 1.5 |
| Draw dawns on inked 10 pt. Tech Service Stack with K-Coater #1 @ 10 | | | |
| Samples dried 2 min @ RT/1 min @ 140° F. - Tested After 16 Hrs | | | |
| WETTING | 3.5 | 4 | 4 |
| LEVELING | 3 | 3.5 | 3.5 |
| HOLDOUT | 4 | 4 | 3.5 |
| 60° GLOSS | | | |
| AVE OF 5 | 34.6 | 35.2 | 29.2 |
| TEMP/REL. HUMIDITY | 70° F./150% | 70° F./150% | 70° F./150% |
| STATIC SLIDE ANGLE | | | |
| JEM - 3.5# SLED | 37.1/39.4 | 29.3/34.1 | 35.3/38.7 |
| FACE/FACE | 44.2/44.5 | 34.1/34.1 | 39.2/38.6 |
| 1ST 5 READINGS | 43.3–41.7 | 34.1–33.2 | 38.2–38.0 |
| AOS VARIATION SPREAD | 7.4 | 5.2 | 3.9 |
| SUTHERLAND RUB | | | |
| FACE/FACE/ w/4# SLED | | | |
| 100 CYCLES | 2 | 1.5 | 1.5 |
| 200 CYCLES | 1.5 | 0.5 | 0.5 |
| BLOCK RESISTANCE | | | |
| 140° F./125 PSI/16 HRS | | | |
| FACE/FACE- DRY | 1.5 | 2 | 2 |
| WATER TEST - 1 DROP | | | |
| FACE/FACE - WET FACE | 0 | 0 | 0 |
| FACE/FACE - WET BACK | 0 | 0 | 0 |

*Film Whitened

Latex Paints

EXAMPLES EM-1 TO EM-9 AND COMPARISON EXAMPLES EM-CM-1 TO EM-CM-3

Four pigment filled latex paint coatings, EM1 to EM4, were made and compared to two standard latex paints (EM-CM-1 and EM-CM-2) using the emulsion polymers described above. The two standard resins included SCX-1520 (a styrene acrylic resin available from S.C. Johnson Polymer, Sturtevant, Wis.) and Joncryl 77 (a styrene acrylic latex available from S.C. Johnson Polymer, Sturtevant, Wis.). The individual mixes for each latex paint example are set forth in Table LX-A. Additional paint compositions (EM-5 to EM-9) were prepared using emulsion compositions prepared using the polymeric compositions of Examples 16, 17 and 18 as support resins. These paint compositions were compared to a paint composition prepared with SCX-1520 (EM-CM-3). The composition of these paints is described in Table LX-B.

The paint compositions were coated onto unpolished cold rolled steel and air dried. The dried paint coatings were then subjected to various tests. The tests included gloss at 20° and 60° after 3 days and 7 days, waterspot testing, methyl ethyl ketone rub resistance testing after air drying for 7 days, (MEK/7), and for Konig hardness after air drying for 1 and 7 days (K1, K7, respectively). Tests on the coatings were also conducted using a 24 hr salt spray test. In this test, face rust (FR) was evaluated (10 (good) –0 (bad)); an x was scribed in the coated panel and the distance of rust creep (Crp) was measured; and a blister rating (Blst) was conducted (blister size is indicated numerically, frequency is indicated by F=few and D=dense). The test results are shown in Table LX-C.

TABLE LX-A

| PAINT: | EM-01 | EM-02 | EM-03 | EM-4 | EM-CM-1 | EM-CM-2 |
|---|---|---|---|---|---|---|
| % Solids | 45 | 40 | 40 | 40 | 41.5 | 46.0 |
| Grind amount: | 40.0 | 40.0 | 40.0 | 40.0 | 40.0 | 40.0 |
| Latex/Poly ID: | EX. EP4 | EX. EP3 | EX. EP5 | EX. EP6 | SCX1520 | J-77 |
| Latex amount: | 115.6 | 130.0 | 130.0 | 115.6 | 125.3 | 113.0 |
| Texanol @ 8%: | 4.2 | 4.2 | 4.2 | 4.2 | 4.2 | 4.2 |
| 5% Sodium Nitrite: | 2.2 | 2.2 | 2.2 | 2.2 | 2.2 | 2.2 |
| DSX1514, 50% aq: | 1.0 | 1.0 | 1.0 | 1.0 | 1.0 | 1.0 |
| Total: | 162.9 | 177.4 | 177.4 | 162.9 | 172.7 | 160.4 |
| % Solids Before adjustment: | 61.3 | 47.1 | 47.1 | 51.3 | 48.4 | 52.1 |

DSX 1514—thickener available from Henkel, Amber, PA
Grind prepared with Tamol ® 1124 dispersant available from Rohm & Haas, Philadelphia, PA
Texanol—an ester solvent available from Union Carbide, Danbury, CT.
Units are in grams unless otherwise indicated

TABLE LX-B

| PAINT: | EM-05 | EM-08 | EM-07 | EM-08 | EM-09 | EM-CM-3 |
|---|---|---|---|---|---|---|
| % Solids | 45.0 | 45.0 | 45.0 | 45.0 | 45.0 | 41.5 |
| Grind amount: | 40.0 | 40.0 | 40.0 | 40.0 | 40.0 | 40.0 |
| Latex/Polymer | EX. EP11 | EX. EP10 | EX. EP9 | EX. EP7 | EX. EP8 | SCX-1520 |
| Latex amount: | 115.6 | 115.6 | 115.6 | 115.6 | 115.6 | 125.3 |
| Texanol @ 8%: | 4.2 | 4.2 | 4.2 | 4.2 | 4.2 | 4.2 |
| 5% Sodium Nitrite: | 2.2 | 2.2 | 2.2 | 2.2 | 2.2 | 2.2 |
| DSX1514, 50% aq: | 1.0 | 1.0 | 1.0 | 1.0 | 1.0 | 1.0 |
| Total: | 162.9 | 162.9 | 162.9 | 162.9 | 162.9 | 172.7 |
| % Solids Before adjustment: | 51.3 | 51.3 | 51.3 | 51.3 | 51.3 | 48.4 |

DSX 1514 - thickener available from Henkel, Amber, PA
Grind prapared with Tamol ® 1124 dispersant available from Rohm & Haas, Philedelphia, PA
Texanol - an ester solvent available from Union Carbide, Danbury, CT.
Units are in grams unless otherwise indicated

TABLE LX-C

| | GLOSS | | | | | MEK/7 | | | | | | |
|---|---|---|---|---|---|---|---|---|---|---|---|---|
| | 20° | 60° | 20° | 60° | Wspot, 24 h dry | onset | | | | | | |
| PAINT | 3 Day | | 7 Day | | Sw/Sft/Bl/color | final | K1 | K7 | DFT | FR | Crp | Blst |
| EM-01 | 78 | 92 | 77 | 92 | 9/6/10/10 | 10/18 | 10 | 15 | 1–1.4 | 9 | 5/32" | 4F |
| EM-02 | 76 | 92 | 74 | 91 | 8/6/10/10 | 8/15 | 11 | 18 | 1–1.4 | 10 | 1/8" | 8D |
| EM-03 | 75 | 93 | 74 | 93 | 8/7/10/10 | 7/17 | 12 | 19 | 1–1.4 | 8 | 1/16" | 6D |
| EM-4 | 78 | 94 | 77 | 94 | 8/8/10/10 | 10/19 | 8 | 12 | 1–1.4 | 9 | 1/8" | 8D |
| EM-CM-1 | 73 | 90 | 72 | 90 | 6/4/10/10 | 13/33 | 26 | 41 | 1–1.4 | 1 | 1/16" | 6D |
| EM-CM-2 | 83 | 94 | 80 | 92 | 7/4/10/10 | 10/19 | 14 | 23 | 1–1.4 | 1 | 1/8" | 6D |
| EM-5 | 90 | 96 | 86 | 96 | 8/2/2VF/10 | 5/7 | 9 | 16 | 1–1.4 | 1 | 1/8" | 6D |
| EM-6 | 88 | 95 | 87 | 94 | 8/5/8M/10 | 6/10 | 6 | 12 | 1–1.4 | 1 | 1/8" | 6D |
| EM-7 | 83 | 93 | 83 | 94 | 10/7/10/10 | 6/11 | 3 | 6 | 1–1.4 | 1 | 1/8" | 6D |
| EM-8 | 82 | 93 | 80 | 91 | 9/10/10/10 | 7/13 | 4 | 9 | 1–1.4 | 1 | 1/8" | 6D |
| EM-9 | 41 | 81 | 42 | 81 | 9/8/10/10 | 7/14 | 3 | 10 | 1–1.4 | 1 | 1/8" | 6D |
| EM-CM-3 | 72 | 90 | 72 | 90 | 7/68M/10 | 13/40 | 26 | 41 | 1–1.4 | 1 | 1/16" | 6D |

Wspot = water spot test; Sw = swelling; Sft = softening; Bl = blistering
MEK = Methyl ethyl ketone rub resistance tests
DFT = Dry film thickness
FR = Face rust; Crp = creep; Blst = blister rating The resistance of each paint coating to gasoline, deionized water, sulfuric acid, muriatic acid, brake fluid, Formula 409® (Chlorox Co., Oakland, Calif.) isopropanol, and sodium hydroxide was tested by subjecting each coating to a 24 hour exposure to each test chemical. The results are shown in Tables LX-D, LX-E, LX-F, and LX-G. (10 is the highest resistance and 0 is the worst).

TABLE LX-D

| Paint | 24 h/Gasoline | | | | 24 h/DIWater | | | |
|---|---|---|---|---|---|---|---|---|
| | SW | s | bl | clr | SW | s | bl | clr |
| EM-01 | 10 | 1 | 10 | 9 | 9 | 6 | 10 | 10 |
| EM-02 | 10 | 0 | 10 | 9 | 9 | 8 | 10 | 10 |
| EM-03 | 10 | 0 | 10 | 9 | 9 | 8 | 10 | 10 |
| EM-04 | 9 | 0 | 10 | 9 | 9 | 9 | 10 | 10 |
| EM-CM-1 | 8 | 0 | 10 | 8 | 9 | 9 | 10 | 9 |
| EM-CM-2 | 10 | 1 | 10 | 9 | 9 | 5 | 10 | 5 |
| EM-05 | 0 | 0 | 0 | 0 | 8 | 6 | 8F | 7 |
| EM-06 | 0 | 0 | 0 | 0 | 9 | 7 | 4D | 10 |
| EM-07 | 0 | 0 | 0 | 0 | 10 | 5 | 8F | 6 |
| EM-08 | 0 | 0 | 0 | 0 | 10 | 7 | 6M | 7 |
| EM-09 | 0 | 0 | 0 | 0 | 10 | 9 | 10 | 6 |
| EM-CM-3 | 9 | 1 | 10 | 8 | 10 | 8 | 10 | 10 |

F = few; D = dense; M = medium
Sw = swelling; s = softness; bl = blistering; clr = color

TABLE LX-E

| Paint | 24 h/5% H$_2$SO$_4$ | | | | 24 h/Mur. Acid | | | |
|---|---|---|---|---|---|---|---|---|
| | SW | s | bl | clr | SW | s | bl | clr |
| EM-01 | 10 | 8 | 10 | 10 | 8 | 2 | 10 | 6 |
| EM-02 | 10 | 9 | 10 | 10 | 9 | 2 | 10 | 7 |
| EM-03 | 10 | 10 | 10 | 10 | 10 | 10 | 10 | 10 |
| EM-04 | 10 | 10 | 10 | 10 | 10 | 10 | 10 | 10 |
| EM-CM-1 | 10 | 10 | 10 | 10 | 9 | 4 | 10 | 10 |
| EM-CM-2 | 10 | 8 | 10 | 10 | 9 | 1 | 10 | 10 |
| EM-05 | 8D | 5 | 8D | 10 | 8 | 2 | 6MD | 10 |
| EM-06 | 10 | 9 | 1 | 10 | 0 | 0 | 0 | 0 |
| EM-07 | 10 | 2 | 1 | 10 | 0 | 0 | 0 | 0 |
| EM-08 | 10 | 2 | 1 | 10 | 0 | 0 | 0 | 0 |
| EM-09 | 6D | 1 | 6D | 10 | 0 | 0 | 0 | 0 |
| EM-CM-3 | 10 | 9 | 10 | 10 | 8 | 10 | 10 | 10 |

D = dense; MD = medium dense
Sw = swelling; s = softness; bl = blistering; clr = color

TABLE LX-F

| Paint | 24 h/Brake Fluid | | | | 24 h/Formula 409 ® | | | |
|---|---|---|---|---|---|---|---|---|
| | SW | s | bl | clr | SW | s | bl | clr |
| EM-01 | 8 | 4 | 10 | 10 | 10 | 3 | 8F | 10 |
| EM-02 | 8 | 1 | 10 | 10 | 9 | 1 | 10 | 10 |
| EM-03 | 8 | 4 | 10 | 10 | 9 | 3 | 4F | 9 |
| EM-04 | 8 | 4 | 10 | 10 | 9 | 2 | 10 | 10 |
| EM-CM-1 | 0 | 0 | 0 | 0 | 0 | 0 | 0 | 0 |
| EM-CM-2 | 0 | 0 | 0 | 0 | 10 | 3 | 10 | 10 |
| EM-05 | 9 | 9 | 10 | 10 | 10 | 4 | 10 | 10 |
| EM-06 | 8 | 8 | 10 | 10 | 9 | 6 | 10 | 8 |
| EM-07 | 10 | 10 | 10 | 10 | 10 | 5 | 10 | 10 |
| EM-08 | 8 | 8 | 10 | 10 | 10 | 8 | 10 | 9 |
| EM-09 | 10 | 10 | 10 | 10 | 10 | 2 | 10 | 10 |
| EM-CM-3 | 0 | 0 | 0 | 0 | 0 | 0 | 0 | 0 |

F = few
Sw = swelling; s = softness; bl = blistering; clr = color

TABLE LX-G

| Paint | 24 h/IPAlc | | | | 24 h/5%NaOH | | | |
|---|---|---|---|---|---|---|---|---|
| | SW | s | bl | clr | SW | s | bl | clr |
| EM-01 | 10 | 9 | 10 | 10 | 9 | 9 | 10 | 10 |
| EM-02 | 9 | 10 | 10 | 10 | 9 | 10 | 10 | 10 |
| EM-03 | 10 | 10 | 10 | 10 | 10 | 10 | 10 | 9 |
| EM-04 | 10 | 10 | 10 | 10 | 0 | 10 | 0 | 0 |
| EM-CM-1 | 10 | 10 | 10 | 10 | 10 | 10 | 8MD | 10 |
| EM-CM-2 | 10 | 7 | 10 | 10 | 9 | 3 | 8D | 8 |
| EM-05 | 10 | 10 | 10 | 10 | 0 | 1 | 6D | 8 |
| EM-06 | 10 | 8 | 10 | 10 | 10 | 2 | 10 | 8 |
| EM-07 | 10 | 10 | 10 | 5 | 10 | 2 | 10 | 2 |
| EM-08 | 10 | 10 | 10 | 6 | 10 | 2 | 10 | 8 |
| EM-09 | 10 | 10 | 10 | 6 | 10 | 1 | 10 | 7 |
| EM-CM-3 | 10 | 10 | 10 | 10 | 9 | 3 | 8D | 10 |

D = dense; MD = medium dense
Sw = swelling; s = softness; bl = blistering; clr = color Other variations and modifications of this invention will be obvious to those skilled in the art. This invention is not limited except as set forth in the following claims.

What is claimed is:

1. An emulsion polymer comprising:
   (a) a support resin emulsion polymerized with
   (b) at least one ethylenically unsaturated monomer, said support resin being an aqueous polymeric dispersion comprising
      (i) a substantially non-gelled polymeric composition comprising the reaction product of an A polymer which is an addition polymer having 3.5 or more reactive functional groups per polymer chain and a B polymer having about 2 to about 3 functional groups per polymer chain that are co-reactive with said reactive functional groups of the A polymer;
      (i) water; and
      (iii) optionally a solubilizing agent.

2. An emulsion polymer according to claim 1, wherein substantially all of the co-reactive functional groups of the B polymer have been co-reacted.

3. An emulsion polymer according to claim 1, wherein a molar ratio of A polymer to B polymer is about 3:1 to about 2:1.7.

4. An emulsion polymer according to claim 1, wherein the B polymer has about 2 functional groups per polymer chain and the molar ratio of A polymer to B polymer is about 2:1 to about 2:1.7.

5. An emulsion polymer according to claim 3, wherein the B polymer has about 3 functional groups per polymer chain and the molar ratio of A polymer to B polymer is about 3:1.

6. An emulsion polymer according to any one of claims 4 or 5, wherein said reactive functional group of the A polymer is a condensation-reactive functional group selected from the group consisting of carboxyl, hydroxyl, epoxy, isocyanato, carboxyl anhydride, sulfo, esterified oxycarbonyl, amino or mixtures thereof.

7. An emulsion polymer according to any one of claims 4 or 5, wherein said B polymer is a condensation polymer selected from the group consisting of polyamide, polyester, epoxy, polyurethane, polyorganosiloxane and poly(ether).

8. An emulsion polymer according to claim 7, wherein said co-reactive functional groups of said B polymer are hydroxyl, carboxyl, epoxy, oxazolinyl, ester, amino, isocyanato or mixtures thereof.

9. An emulsion polymer according to claim 8, wherein said A polymer has 3.5 or more carboxyl functional groups per polymer chain.

10. An emulsion polymer according to claim 9, wherein said A polymer is a styrene/acrylic acid/α-methyl-styrene polymer having a Mn in a range from about 500 to about 50,000.

11. An emulsion polymer according to claim 8, wherein said A polymer has 3.5 or more hydroxyl functional groups per polymer chain.

12. An emulsion polymer according to any one of claims 4 or 5, wherein said aqueous polymeric dispersion further comprises a solubilizing agent.

13. An emulsion polymer according to claim 12, wherein said aqueous polymeric dispersion further comprises a co-solvent.

14. An emulsion polymer according to claim 12, further comprising at least one additional component selected from the group consisting of pigments, fillers, thickeners, dispersants and other polymeric compositions.

15. A method for preparing an emulsion polymer comprising the step of combining under emulsion polymerizable reaction conditions (a) an aqueous polymeric dispersant comprising:
  (i) a substantially non-gelled polymeric composition comprising the reaction product of an A polymer which is an addition polymer having 3.5 or more reactive functional groups per polymer chain and a B polymer having about 2 to about 3 functional groups per polymer chain that are co-reactive with said reactive functional groups of the A polymer;
  (ii) water; and
  (iii) optionally a solubilizing agent;

(b) at least one ethylenically unsaturated monomer; and (c) an initiator.

* * * * *